United States Patent
Adl et al.

(10) Patent No.: US 12,499,355 B1
(45) Date of Patent: Dec. 16, 2025

(54) COMPLEX NEUROMORPHIC ADAPTIVE CORE (NEURACORE) AND PHYSICS ENHANCED NEUROMORPHIC ADAPTIVE CONTROLLER

(71) Applicant: HRL Laboratories, LLC, Malibu, CA (US)

(72) Inventors: Sanaz Adl, Thousand Oaks, CA (US); Bryan H. Fong, Los Angeles, CA (US); Peter Petre, Oak Park, CA (US); Charles E. Martin, Santa Monica, CA (US); Adour V. Kabakian, Monterey Park, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 1156 days.

(21) Appl. No.: 17/369,742

(22) Filed: Jul. 7, 2021

Related U.S. Application Data

(60) Provisional application No. 63/051,851, filed on Jul. 14, 2020, provisional application No. 63/051,368, filed on Jul. 13, 2020.

(51) Int. Cl.
  *G06N 3/063* (2023.01)
  *G06N 3/049* (2023.01)
  *G06N 3/08* (2023.01)

(52) U.S. Cl.
  CPC ............ *G06N 3/063* (2013.01); *G06N 3/049* (2013.01); *G06N 3/08* (2013.01)

(58) Field of Classification Search
  CPC ........... G06N 3/063; G06N 3/049; G06N 3/08
  See application file for complete search history.

(56) References Cited

U.S. PATENT DOCUMENTS

| | | | |
|---|---|---|---|
| 5,694,474 | A | 12/1997 | Ngo |
| 7,474,756 | B2 | 1/2009 | Ricard et al. |
| 8,031,117 | B2 | 10/2011 | Goldberg |
| 9,042,496 | B1 | 5/2015 | Su |
| 10,003,483 | B1 * | 6/2018 | Migliori ............... H04L 27/0012 |
| 10,128,820 | B2 | 11/2018 | Petre et al. |
| 10,153,806 | B1 * | 12/2018 | Petre ........................ G06N 3/08 |

(Continued)

OTHER PUBLICATIONS

Office Action 1 for Chinese Patent Application No. 201780078246.2, Dated: Dec. 3, 2020.

(Continued)

*Primary Examiner* — Hien L Duong
(74) *Attorney, Agent, or Firm* — TOPE-MCKAY & ASSOCIATES

(57) ABSTRACT

Described is a Neuromorphic Adaptive Core (NeurACore) cognitive signal processor (CSP). The NeurACore CSP includes a NeurACore local learning layer block that is operable for receiving as an input a mixture of in-phase and quadrature (I/Q) signals and mapping the I/Q signals onto a neural network to determine complex-valued output weights of neural states of the neural network. A global learning layer is included that is operable for adapting the complex-valued output weights to predict a most likely next value of the input I/Q signal. Further, a neural combiner is included that operable for combining a set of delayed neural state vectors with weights of the global learning layer to compute an output signal, the output signal being separate in-phase and quadrature signals.

18 Claims, 33 Drawing Sheets

(56) References Cited

U.S. PATENT DOCUMENTS

| | | | |
|---|---|---|---|
| 10,162,378 B1* | 12/2018 | Rao | G06F 1/08 |
| 10,211,856 B1* | 2/2019 | Petre | H04B 1/001 |
| 10,380,062 B1* | 8/2019 | Rao | G06F 18/2134 |
| 10,404,299 B1* | 9/2019 | Petre | H04B 1/10 |
| 10,671,912 B2* | 6/2020 | Gottfried | G06N 3/049 |
| 10,720,949 B1* | 7/2020 | Rao | G06N 3/08 |
| 10,891,543 B2* | 1/2021 | Hosokawa | G06N 3/088 |
| 11,449,735 B2* | 9/2022 | Chang | G06N 3/063 |
| 2005/0047611 A1 | 3/2005 | Mao | |
| 2010/0158271 A1* | 6/2010 | Park | H04R 3/005 381/94.7 |
| 2012/0232418 A1 | 9/2012 | Kimura | |
| 2013/0204819 A1* | 8/2013 | Hunzinger | G06N 3/08 706/25 |
| 2014/0009224 A1* | 1/2014 | van Zelm | H03F 3/68 330/84 |
| 2015/0127150 A1* | 5/2015 | Ponulak | B25J 9/161 700/250 |
| 2016/0203827 A1 | 7/2016 | Leff | |
| 2018/0076795 A1* | 3/2018 | Petre | H04B 1/719 |
| 2018/0089558 A1* | 3/2018 | Wittenberg | G06N 3/044 |
| 2019/0120932 A1* | 4/2019 | Smith | G01S 7/2955 |
| 2019/0187245 A1* | 6/2019 | Guarin Aristizabal | G01S 7/038 |
| 2019/0248007 A1* | 8/2019 | Duffy | B25J 9/1653 |
| 2019/0324108 A1* | 10/2019 | Wittenberg | G01S 13/42 |
| 2020/0034331 A1* | 1/2020 | Petre | G06F 1/10 |
| 2020/0373950 A1* | 11/2020 | Cai | H03F 1/0222 |
| 2021/0125048 A1* | 4/2021 | Jang | G11C 13/003 |
| 2022/0253674 A1* | 8/2022 | Sakemi | G06N 3/08 |
| 2022/0278755 A1* | 9/2022 | Lee | H04L 27/233 |

OTHER PUBLICATIONS

English translation of Office Action 1 for Chinese Patent Application No. 201780078246.2, Date mailed: Dec. 3, 2020.
Andrius Petrenas, "Reservoir Computing for Extraction of Low Amplitude Atrial Activity in Atrial Fibrillation", Computing in Cardiology(CINC), pp. 13-16.
Response to Office Action 1 for Chinese Patent Application No. 201780078246.2, Date filed Apr. 14, 2021.
English translation of amended claims in Response to Office Action 1 for Chinese Patent Application No. 201780078246.2, Date filed Apr. 14, 2021.
Office Action 2 for Chinese Patent Application No. 201780078246.2, Dated: Jul. 21, 2021.
English translation of Office Action 2 for Chinese Patent Application No. 201780078246.2, Date mailed: Jul. 21, 2021.
Response to Office Action 2 for Chinese Patent Application No. 201780078246.2, Date filed Sep. 13, 2021.
English translation of amended claims in Response to Office Action 2 for Chinese Patent Application No. 201780078246.2, Date filed Sep. 13, 2021.
Decision of Rejection for Chinese Patent Application No. 201780078246.2, Dated: Jan. 4, 2022.
Request for Reexamination for Chinese Patent Application No. 201780078246.2, Filed Mar. 30, 2022.
English translation of amended claims in Request for Reexamination for Chinese Patent Application No. 201780078246.2, Date filed Mar. 30, 2022.
Reexamination Decision for Chinese Patent Application No. 201780078246.2, Dated May 6, 2022.
Amendment for Chinese Patent Application No. 201780078246.2, Dated Jun. 20, 2022.
English translation of amended claims in Amendment for Chinese Patent Application No. 201780078246.2, Date filed Jun. 20, 2022.
Notice of Allowance for Chinese Patent Application No. 201780078246.2, Date filed Jul. 5, 2022.
English translation of Notice of Allowance for Chinese Patent Application No. 201780078246.2, Date filed Jul. 5, 2022.
Patent Certificate for Chinese Patent No. CN 110088635 B, Dated Sep. 20, 2022.
English translation of the Patent Certificate for Chinese Patent No. CN 110088635 B, Dated Sep. 20, 2022.
Communication pursuant to Rules 161 (2) and 162 EPC for European Regional Phase Patent Application No. 17892664.8, dated Aug. 27, 2019.
Response to the communication pursuant to Rules 161(2) and 162 EPC for European Regional Phase Patent Application No. 17892664.8, dated Mar. 6, 2020.
Communication pursuant to Rules 70(2) and 70a(2) EPC (the supplementary European search report) for the European Regional Phase Patent Application No. 17892664.8, dated Oct. 22, 2020.
Andrius Petrenas, et al, "Reservoir computing for extraction of low amplitude atrial activity in atrial fibrillation," Computing in Cardiology (CINC). 2012. IEEE. Sep. 9, 2012 (Sep. 9, 2012). pp. 13-16. XP032317043. ISBN: 978-1-4673-2076-4.
Ali Deihimi, et al, "Application of echo state network for harmonic detection in distribution networks," IET Generation. Transmission &Distribution. vol. 11. No. 5. Dec. 21, 2016 (Dec. 21, 2016). pp. 1094-1101. XP055733455.
Herbert Jaeger, "Controlling Recurrent Neural Networks by Conceptors," Technical Report No. 31, Jul. 22, 2016 (Jul. 22, 2016). XP055732541, Retrieved from the Internet: URL:https:jjarxiv.orgjpdf/1 403.3369v2. pdf [retrieved on Sep. 21, 2020].
Ozturk, et al, "An associative memory readout for ESNs with applications to dynamical pattern recognition," Neural Networks. Elsevier Science Publishers. Barking. GB. vol. 20. No. 3. Jun. 5, 2007 (Jun. 5, 2007). pp. 377-390. XP022104570.
Response to the communication pursuant to Rules 70(2) and 70a (2) EPC (the supplementary European search report) for the European Regional Phase Patent Application No. 17892664.8, dated Apr. 22, 2021.
Pathak et al., entitled, "Hybrid forecasting of chaotic processes: Using machine learning in conjunction with a knowledge-based model," arXiv:1803.04779, 2018, pp. 1-9.
S. Choi, A. Cichocki, H.-M. Park, and S.-Y. Lee, "Blind Source Separation and Independent Component Analysis: A Review," Neural Information Processing—Letters, vol. 6, No. 1, Jan. 2005, pp. 1-57.
A. Cichocki and A. Belouchrani, "Sources separation of temporally correlated sources from noisy data using a bank of band-pass filters," in Proc. of Independent Component Analysis and Signal Separation (ICA-2001), pp. 173-178, San Diego, USA, Dec. 9-13, 2001.
A. Hyvarinen, "Complexity Pursuit: Separating Interesting Components from Time Series," Neural Computation, vol. 13, No. 4, pp. 883-898, Apr. 2001.
Igel, C. and Husken, M., "Improving the Rprop learning algorithm", in Proc. of the 2nd Int. Symposium on Neural Computation (NC'2000), pp. 115-121, ICSC Academic Press, 2000.
R. Legenstein, et al. "Edge of Chaos and Prediction of Computational Performance for Neural Microcircuit Models," Neural Networks, 20(3), pp. 323-334, 2007.
W. Maass, "Liquid Computing", Proc. of the Conference CiE'07 : Computability in Europe 2007, Siena (Italy), pp. 507-516.
F. Takens, "Detecting Strange Attractors in Turbulence," Dynamical Systems and Turbulence, Lecture Notes in Mathematics vol. 898, 1981, pp. 366-381.
D. Verstraeten, et al. "An experimental unification of reservoir computing methods", Neural Networks, vol. 20, No. 3, Apr. 2007, pp. 391-403.
R. H. Walden, "Analog-to-digital converter survey and analysis," IEEE J. Sel. Areas Commun., vol. 51, pp. 539-548, 1999.
H. Yap, et al., "A First Analysis of the Stability of Takens' Embedding," in Proc. of the IEEE Global Conference on Signal and Information Processing (GlobalSIP) symposium on Information Processing for Big Data, Dec. 2014, pp. 404-408.
Office Action 1 for U.S. Appl. No. 15/817,906, Date mailed: Feb. 23, 2018.
Response to Office Action 1 for U.S. Appl. No. 15/817,906, Date mailed: May 23, 2018.

(56) References Cited

OTHER PUBLICATIONS

Notice of Allowance for U.S. Appl. No. 15/817,906, Date mailed: Jul. 6, 2018.
Notification of Transmittal of International Search Report and the Written Opinion of the International Searching Authority for PCT/US2017/062561 ; date of mailing Feb. 6, 2018.
International Search Report of the International Searching Authority forPCT/US2017/062561; date of mailing Feb. 6, 2018.
Written Opinion of the International Searching Authority for PCT/US2017/062561; date of mailing Feb. 6, 2018.
Notification of International Preliminary Report on Patentability (Chapter I) for PCT/US2017/062561; date of mailing Aug. 1, 2019.
International Preliminary Report on Patentability (Chapter I) for PCT/US2017/062561; date of mailing Aug. 1, 2019.
M. Lukosevicius, H. Jaeger: "Reservoir computing approaches to recurrent neural network training", Computer Science Review (2009), Computer Science Review 3 ( 2009 ) pp. 127-149.
Jing Dai, et al.: "An Introduction to the Echo State Network and its Applications in Power System", 2009 15th International Conference on Intelligent System Applications to Power Systems, IEEE, pp. 1-7.

\* cited by examiner

100

Address/Data Bus  102

Single Merged Signal Detected

COMPLEX NEUROMORPHIC ADAPTIVE CORE (NEURACORE) AND PHYSICS ENHANCED NEUROMORPHIC ADAPTIVE CONTROLLER

CROSS-REFERENCE TO RELATED APPLICATIONS

This application claims the benefit of and is a non-provisional patent application of U.S. 63/051,368, filed on Jul. 13, 2020, the entirety of which is hereby incorporated by reference.

This application ALSO claims the benefit of and is a non-provisional patent application of U.S. 63/051,851, filed on Jul. 14, 2020, the entirety of which is hereby incorporated by reference.

BACKGROUND OF INVENTION

(1) Field of Invention

The present invention relates to signal processor and corresponding controller and, more specifically, to a cognitive signal processor (CSP) having a neuromorphic adaptive core and controller that learns system characteristics in real time and provides a control signal that has been adjusted to reflect changing system characteristics.

(2) Description of Related Art

Reservoir type computers, or reservoir computing, is a computation framework that uses a recurrent neural network to map input signals into higher dimensional spaces through the dynamics of a fixed, non-linear reservoir. A problem with such existing reservoir computing technologies is that they employ a reservoir with fixed core weights that do not adapt to new situations. Another existing problem with the prior art is that the learning output layer can handle only real-valued signals, meaning that they are incapable of handling complex-valued I/Q signals while preserving their phase coherence. Since I/Q signals are commonly encountered in communication and radar signal processing, existing reservoir computing technologies are not well suited for such applications. Further, since existing reservoir systems have fixed core weights, they require a lot of cores to detect/sense and separate signals, also rendering them generally unsuitable for communication and radar signal processing.

One recent patent for wideband signal denoising is described in U.S. Pat. No. 10,128,820 (the '820 patent), the entirety of which is incorporated herein by reference. While somewhat relevant to the present disclosure, the '820 uses a fixed reservoir with no embedded physics and no neuromorphic adaptive cores.

A reference that combines a physical system model with a reservoir-type computer is described by Pathak et al., entitled, "Hybrid forecasting of chaotic processes: Using machine learning in conjunction with a knowledge-based model," the entirety of which is incorporated herein by reference. The Pathak paper describes the combination of a physics-based model with a reservoir computer for forecasting; thus, the output of a physics based model is fed into a reservoir, and the reservoir output is combined with the physics-based model output in an output layer to give a predicted value. The output layer weights are trained using historical time-series data, which does not occur in real-time. Notably, the process as described by Pathak does not allow for simultaneous coupling of reservoir and physical model into an extended phase (or state) space, and more importantly, real-time learning of changing system parameters is not supported. The prior art uses a reservoir to model unknown properties of a stationary physical system (not time-evolving properties). In other words, the existing technologies and prior art are focused on combining knowledge-based models and reservoir computers for forecasting rather than real-time learning.

Thus, a continuing need exists for system that employs real-time learning with reservoir computers and specialized neuromorphic core for denoising applications. Such a neuromorphic core and corresponding controller should allow for adaptation in real time in order to optimize the rapid detection and sensing of signals present in the input stream, using fewer resources than the prior reservoir-based art. Further, such a core should include a new learning layer to handle complex-valued I/Q signals while preserving their phase coherence, thus expanding significantly the range of applications. Finally, such a controller should allow for both a physics-based model and a neuromorphic core to learn both unknown and time-evolving properties of physical systems.

SUMMARY OF INVENTION

The present disclosure is directed to a Neuromorphic Adaptive Core (NeurACore) cognitive signal processor (CSP). The NeurACore CSP includes a NeurACore local learning layer block that is operable for receiving as an input a mixture of in-phase and quadrature (I/Q) signals and mapping the I/Q signals onto a neural network to determine complex-valued output weights of neural states of the neural network. Also included is a global learning layer operable for adapting the complex-valued output weights to predict a most likely next value of the input I/Q signal. A neural combiner is included that is operable for combining a set of delayed neural state vectors with weights of the global learning layer to compute an output signal, the output signal being separate in-phase and quadrature signals.

In another aspect, an adaption module is included that embeds a time-evolving physical model into the NeurACore local learning layer block.

In yet another aspect, the time-evolving physical model evolves the NeurACore local learning layer block based on at least one of a neural state vector, an input signal, embedded physical equations reflecting current dynamics of a physical system.

In another aspect, the NeurACore local learning layer block includes oscillators that represent an instantaneous spectrum of the input mixture of I/Q signals.

In yet another aspect, the input mixture I/Q signals are an input signal selected from a communication signal and a radar signal, with the output signal being denoised communication and radar signals.

Additionally, the NeurACore local learning layer block is adaptable for frequency and quality factor.

Further, the NeurACore local learning layer utilizes blind source separation to separate signals similar in frequency.

In another aspect, a physics enhanced neuromorphic adaptive controller is electronically coupled with both a physical system and with the NeurAcore CSP for controlling the NeurACore CSP.

In another aspect, the present disclosure is directed to a physics enhanced neuromorphic adaptive controller, comprising a physics-enhanced (PE) neuromorphic adaptive core (NeurACore), the PE NeurACore being operable for receiving as an input a mixture of in-phase and quadrature (I/Q) signals and generating an output signal, the output signal being separate in-phase and I/Q signals; and a controller coupled to the PE NEurACore, the controller operable for controlling a physical system based on the separate in-phase and I/Q signals.

In another aspect, physical system can be coupled to the physics enhanced neuromorphic adaptive controller. Further, the PE NeurACore includes system parameters, input layer weights, reservoir poles, and output layer weights, that are adjustable in real-time to capture behavior of the physical system. Additionally, the controller includes a compensator and inverse physical system model that uses learned parameters of the PE NeurACore to generate a pre-distorted input signal that, when fed to the physical system, produces the desired physical system output.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
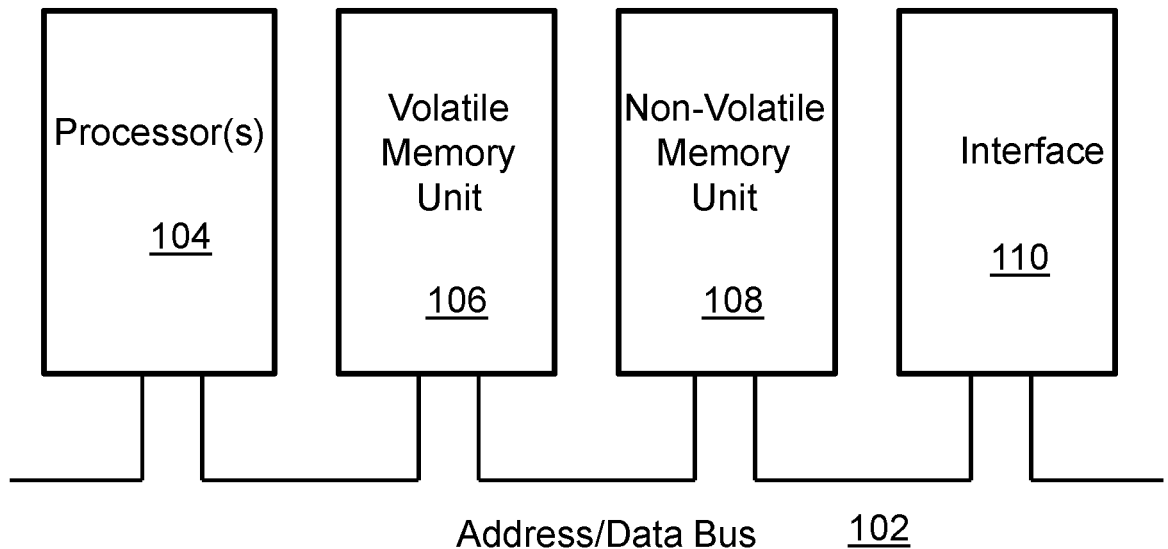
FIG. 1 is a block diagram depicting the components of a system according to various embodiments of the present invention.
Figure 1:
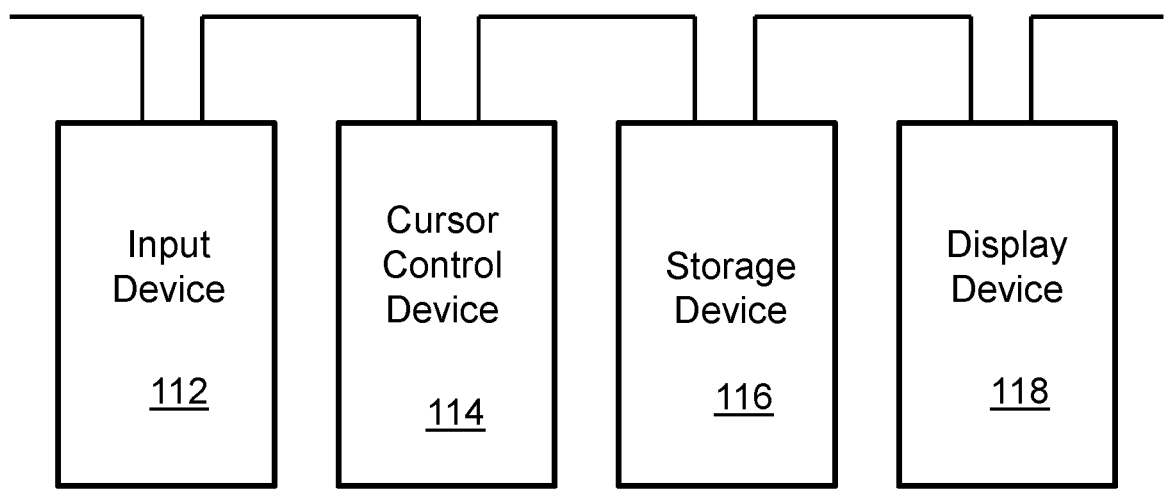

The present invention relates to system core and corresponding controller and, more specifically, to a neuromorphic adaptive core and controller that learns system characteristics in real time and provides a control signal that has been adjusted to reflect changing system characteristics. The following description is presented to enable one of ordinary skill in the art to make and use the invention and to incorporate it in the context of particular applications. Various modifications, as well as a variety of uses in different applications, will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112(f). In particular, the use of "step of" or "act of" in the claims herein is not intended to invoke the provisions of 35 U.S.C. 112(f).

Before describing the invention in detail, first a description of the various principal aspects of the present invention is provided. Subsequently, an introduction provides the reader with a general understanding of the present invention. Finally, specific details of various embodiment of the present invention are provided to give an understanding of the specific aspects.

(2) Principal Aspects

Various embodiments of the invention include at least three "principal" aspects. The first is a system embodied as a complex neuromorphic adaptive core (NeurACore) having an associated physics enhanced neuromorphic adaptive controller. In one aspect, the system operates as a "cognitive" signal processor (CSP) for signal denoising and is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein. In various aspects, the computer system 100 can be embodied in any device(s) that operates to perform the functions as described herein as applicable to the particular application, such as a desktop computer, a mobile or smart phone, a tablet computer, a computer embodied in a mobile platform, or any other device or devices that can individually and/or collectively execute the instructions to perform the related operations/processes.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA) or any other processing component operable for performing the relevant operations.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology. Further, one or more processors 104 (or devices, such as autonomous platforms or signal processors) can be associated with one or more associated memories, where each associated memory is a non-transitory computer-readable medium. Each associated memory can be associated with a single processor 104 (or device), or a network of interacting processors 104 (or devices).

In one aspect, the computer system 100 may include an input device 112 coupled with the address/data bus 102, wherein the input device 112 is configured to communicate information and command selections to the processor 104. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 104. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
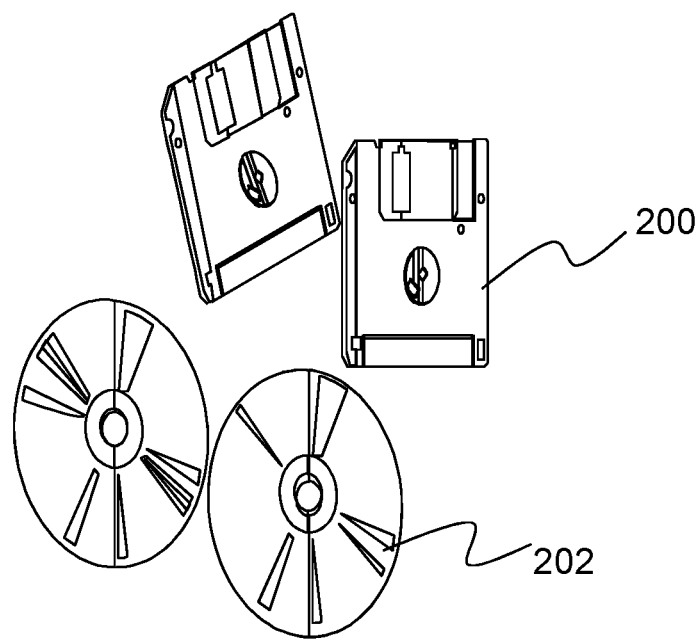
FIG. 2 is an illustration of a computer program product embodying an aspect of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(2) Introduction

As noted above, the present disclosure is directed to a cognitive signal processor (CSP) having a Neuromorphic Adaptive Core (NeurACore) and controller that can detect, de-noise, blindly separate and classify mixtures of complex-valued I/Q (in-phase and quadrature) signals over a very large bandwidth. A unique aspect is the NeurACore architecture that is capable of processing complex I/Q (in-phase and quadrature) signals and online learning throughout the core as well as the output layers.

The CSP includes a unique time-evolving neural network comprising the NeurACore with online learning, which allows rapid adaptation of the CSP to new circumstances. A very simple example of such adaptation is the continuous shifting of pole frequencies along with adjusting their Quality (Q)-factors to sense and track composite signals, in order to optimally de-noise and separate them. The CSP also includes a unique learning output layer that computes complex-valued weights for the complex-valued neural state vector. This enables output layer learning for complex-valued I/Q (in-phase and quadrature) signals that are common in communication and radar signal processing. Based on the above, the CSP and NeurACore of the present disclosure is significantly different than existing technologies, with multiple innovations such as: (1) the ability to embed physical model equations in the cores and/or output layer, (2) the neuromorphic adaptive cores (as referenced above), and (3) the ability to extend the learning output layer to a true complex-valued formulation that maintains the phase relationship between the I- and Q-channels instead of a simplistic system that de-noises the I- and Q-channels independently.

As can be appreciated by those skilled in the art, the NeurACore CSP architecture enables real-time complex/real signal denoising/detection algorithms capable of ultra-wide bandwidth operation with signal processing units that are ultra-low Cost, Size, Weight, and Power (C-SWaP). The NeurACore denoiser can detect and de-noise complex (I/Q) signals, including Low Probability of Intercept/Detection (LPI/LPD) and frequency hopping signals, improving signal-to-noise (SNR) performance by over 20 dB for a variety of different waveforms. The application domain of the NeurACore CSP includes, but is not limited to radar, communication, acoustic, audio, video and optical waveforms. The NeurACore I/Q cognitive signal processor as described in this disclosure can also be used to improve SNR of the various radar units included in an autonomous driving system. The very wide bandwidth, fast response to input changes, and low C-SWaP attributes of our CSP are enabled by a combination of (1) very rapid online learning and (2) the fast adaptability of the core weights, which enables tracking and adapting to rapid changes using a reduced complexity core. The NeurACore design can also be used as a basis to develop novel controllers, an example of which is provided in further detail below.

The present disclosure also provides a Physics Enhanced Neuromorphic Adaptive Core Controller that combines prior system knowledge with learned system characteristics to produce a high-fidelity controller capable of rapid adaptation to novel and unexpected situations. In this aspect, the invention includes a forward model and controller: the forward model incorporates a physics-based model capturing prior system knowledge, together with a neuromorphic adaptive core ("NeurACore") with adaptable input layer, neuromorphic core, and output parameters, while the controller comprises an inverse physics-based model and compensator. The core of the invention in this aspect is the combination of prior system knowledge and adaptability in both forward and inverse models. The physics-based model comprises a set of differential, differential-algebraic, or other equations. As noted above, NeurACore is a neuromorphic computer consisting of input, neuromorphic core, and output layers. The physics model and NeurACore can be combined in series, where the output of the physics model is used as input to NeurACore, or vice versa. Alternatively, the physics model and NeurACore can operate in parallel, in a combined phase space. Thus, in this aspect, the present disclosure provides a controller capable of rapid adaptation to new and unexpected changes in system characteristics. For a controller without adaptability, an unexpected change in system characteristics may cause catastrophic failure: the controller continues to generate an input signal based on obsolete system characteristics. The Physics Enhanced Neuromorphic Adaptive Core Controller learns the system characteristics in real time and provides a control signal that has been adjusted to reflect changing system characteristics, allowing implementation in any system where adaptive control systems are required. Specific details are provided below.

For clarity, the NeurACore and Physics Enhanced Neuromorphic Adaptive Core Controller are described in turn below.

(3) Specific Details of Various Embodiments

As referenced above, the present disclosure is directed to a cognitive signal processor (CSP) having a Neuromorphic Adaptive Core (NeurACore) and an Enhanced Neuromorphic Adaptive Core Controller. For clarity, the NeurACore and Physics Enhanced Neuromorphic Adaptive Core Controller are described in turn below.

(3.1) Neuromorphic Adaptive Core (NeurACore)

Figure 3A:
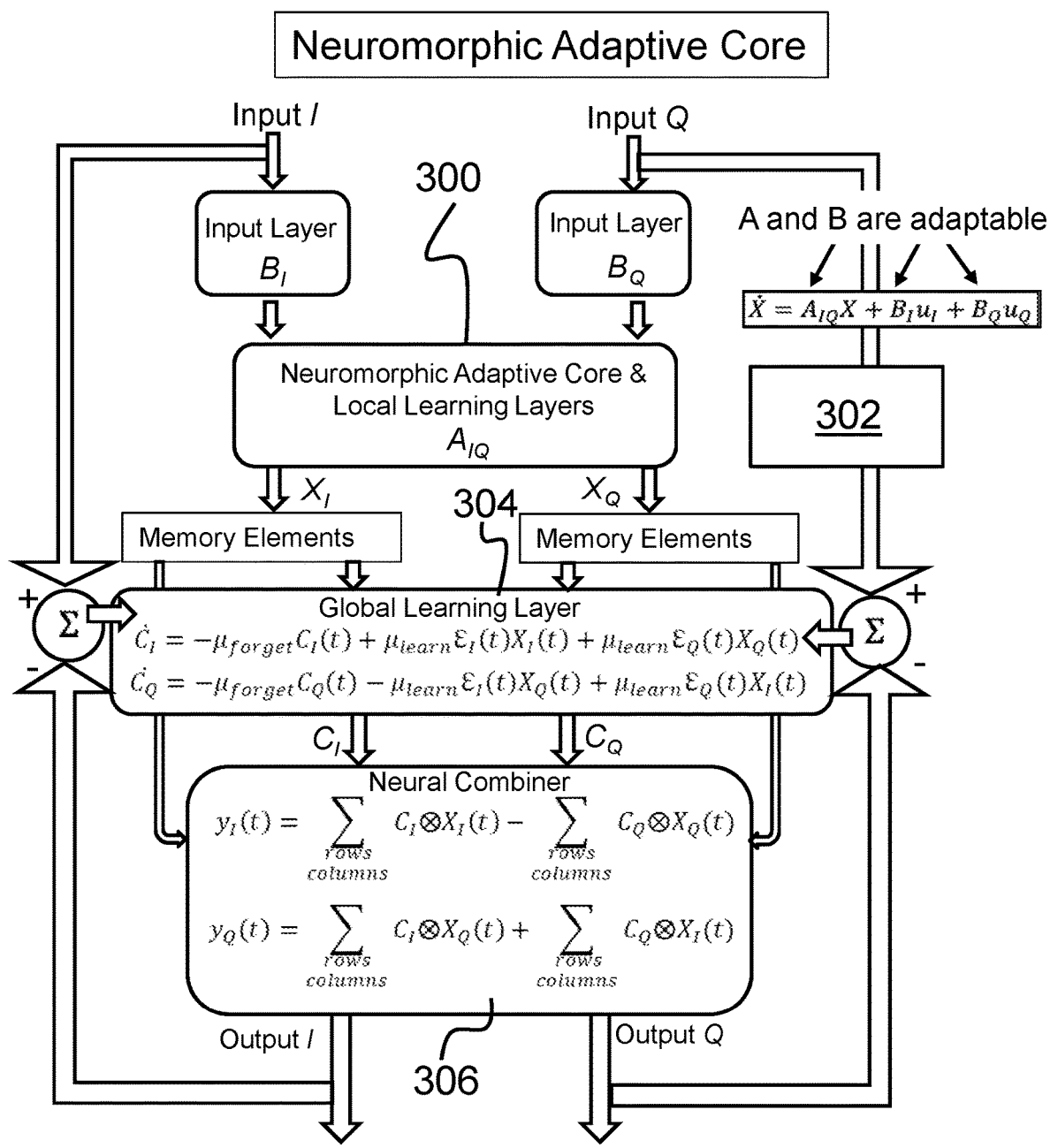
FIG. 3A is a diagram depicting architecture of a Nueromorphic Adaptive Core (NeurACore) according to various embodiments of the present invention.

The NeurACore CSP architecture comprises three primary functional modules and two optional ones that can be brought online independently of each other. The main architecture along with a list of key innovations are shown in FIG. 3A. The first primary block, referred to as the "neuromorphic adaptive core & local learning layers" 300, receives as input a mixture of real and I/Q signals that it maps onto a neuromorphic core neural network with weights that are by default fixed. The local learning layers enable real-time optimization of a "feature extraction" process. An optional adaptation module 302 can be turned on to make the core adaptable in real time, transforming it into a neuromorphic adaptive core (NeurACore). Adaptation can be performed using various parameters including, but not limited to, the neural state vector of the cores and optional time-evolving embedded physical models. The second primary module, called "global learning layer" 304, is a short-time online learning engine that adapts the complex-valued output weights of the reservoir states to predict the most likely next value of the input signal. The global learning layer module 304 uses layers to effectively learn system functions. The third primary module, referred to as the "neural combiner" 306, then combines a set of delayed neural state vectors with the weights of the second module to compute the output signal.

As can be appreciated by those skilled in the art, the NeurACore provides several innovative aspects that improve upon the prior art, including:
1. Local online learning layers to enable real-time optimization of "feature extraction" process;
2. Global online learning layers to effectively learn system functions;
3. Prior knowledge effectively incorporated into the state-space model of NeurACore;
4. Unique core design to enable effective complex I/Q processing;
5. Hardware efficient complex online learning algorithm for IQ processing; and
6. Effective hardware implementation that-requires the least amount of multipliers.

(3.1.1) Concept Overview

A neuromorphic core with fixed weights is a special type of Recurrent Neural Network (RNN) that can be represented in state-space form as follows:

$$\underline{\dot{X}}(t) = \underline{A}\underline{X}(t) + \underline{B}u(t)$$

$$y(t) = \underline{C}(t)^T \underline{X}(t) + D(t)u(t),$$

where $\underline{A}$ is the connectivity matrix with fixed weights, $\underline{B}$ is the vector mapping the input u(t) to the core, $\underline{X}(t)$ is the neural state vector, $\underline{C}(t)$ is the set of tunable output layer weights that map a time-delayed set of states to the output y(t), and D(t) is the seldom used direct mapping from input to output. By adapting the connection weights of the core in real time, it is extended into a neuromorphic adaptive core (NeurACore) and the CSP takes on the new generic form $$\underline{\dot{X}}(t) = \underline{A}(\underline{X}(t), u(t), \ldots)\underline{X}(t) + \underline{B}u(t)$$

$$y(t) = \underline{C}(t)^T \underline{X}(t) + D(t)u(t),$$

where the expression $\underline{A}(\underline{X}(t), u(t), \ldots)$ explicitly indicates the time-dependence of the cores on the neural state vector, the input, and other possible parameters such as an embedded physics model.

(3.1.2) Complex-Valued Formulation

The NeurACore CSP is designed to handle both real and complex-valued I/Q signals; therefore, any quantities in the matrices and vectors of the CSP equations can be complex-valued. From here on, the real and imaginary parts of all quantities are explicitly written to (1) show how the phase-preserving relationship between the I—(real part) and Q—(imaginary part) signals works, and (2) to make the formulation compatible with embedded hardware that typically cannot process true complex-valued variables. The first equation of the CSP takes the form:

$$\begin{bmatrix} \dot{X}_I \\ \dot{X}_Q \end{bmatrix} = \underline{A} \begin{bmatrix} X_I \\ X_Q \end{bmatrix} + \underline{B}_I u_I + \underline{B}_Q u_Q,$$

where the I and Q subscripts refer to the I- and Q-channels. For example, $u_I$ is the I-channel of the input and $u_Q$ is the Q-channels of the input.

(3.1.3) NeurACore Instantiation for Communication and Radar Systems

While the NeurACore architecture is very general, of particular practical interest is its instantiation for processing radio frequency (RF) and acoustic signals for communication and radar/sonar. For such applications, the nodes of the core are designed to be resonators/oscillators with tunable frequency W and tunable quality factor Q. For this instantiation of NeurACore, the $\underline{A}$ matrix comprises of the following 2×2 blocks and $\underline{B}$ consists of 2×1 blocks:

$$\underline{A}^{2\times2} = \begin{bmatrix} -\frac{|\omega_0|}{Q_0} & -\omega_0 \\ \omega_0 & -\frac{|\omega_0|}{Q_0} \end{bmatrix} \underline{B}_I^{2\times1} = \frac{|\omega_0|}{Q_0}\begin{bmatrix}1\\0\end{bmatrix} \underline{B}_Q^{2\times1} = \frac{|\omega_0|}{Q_0}\begin{bmatrix}0\\1\end{bmatrix}$$

These then constitute the complex conjugate pole pairs, as follows:

$$p_{01} = -\frac{|\omega_0|}{Q_0} + i\omega_0 \text{ and } p_{02} = -\frac{|\omega_0|}{Q_0} - i\omega_0.$$

For this instantiation, the matrices and vectors of the first equation of NeurACore have the following general form:

$$\underline{A} = \begin{bmatrix} \begin{bmatrix} -\frac{|\omega_1|}{Q_1} & -\omega_1 \\ \omega_1 & -\frac{|\omega_1|}{Q_1} \end{bmatrix} & & & \\ & \begin{bmatrix} -\frac{|\omega_2|}{Q_2} & -\omega_2 \\ \omega_2 & -\frac{|\omega_2|}{Q_2} \end{bmatrix} & & \\ & & \ddots & \\ & & & \begin{bmatrix} -\frac{|\omega_N|}{Q_N} & -\omega_N \\ \omega_N & -\frac{|\omega_N|}{Q_N} \end{bmatrix} \end{bmatrix}$$

$$\underline{B}_I = \begin{bmatrix} \frac{|\omega_1|}{Q_1} \\ 0 \\ \frac{|\omega_2|}{Q_2} \\ 0 \\ \vdots \\ \frac{|\omega_N|}{Q_N} \\ 0 \end{bmatrix} \underline{B}_Q = \begin{bmatrix} 0 \\ \frac{|\omega_1|}{Q_1} \\ 0 \\ \frac{|\omega_2|}{Q_2} \\ \vdots \\ 0 \\ \frac{|\omega_N|}{Q_N} \end{bmatrix}$$

where N is the total number of pole pairs.

(3.1.4) NeurACore Adaptation Module 300

Figure 3B:
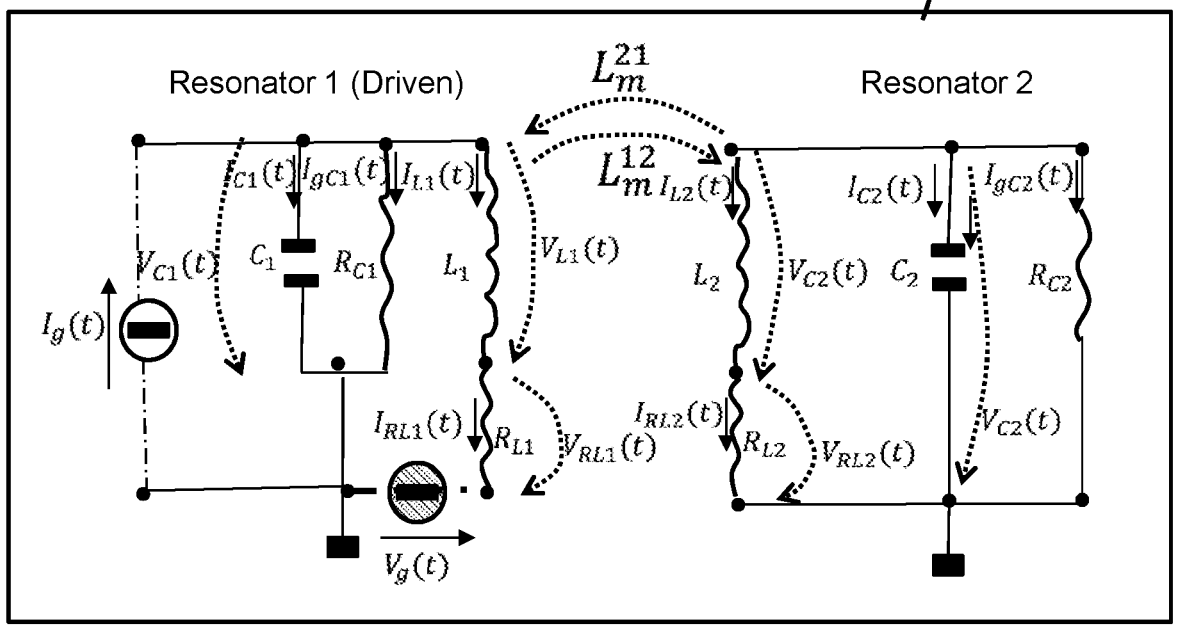
FIG. 3B is an illustration of an adaptation module according to various embodiments of the present invention.
Figure 4:
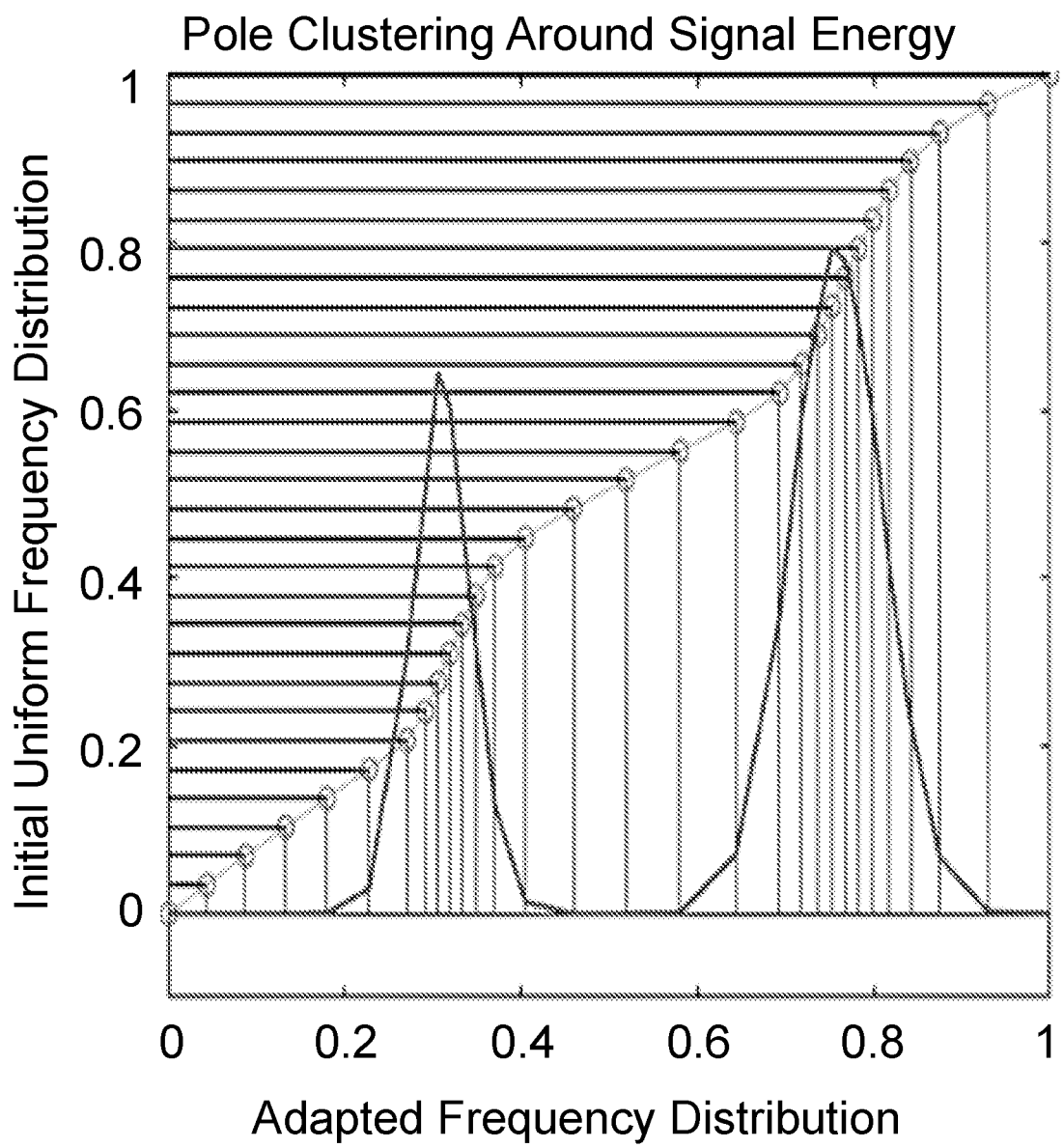
FIG. 4 is a chart depicting frequency adaptation to cluster poles around signals.
Figure 5:
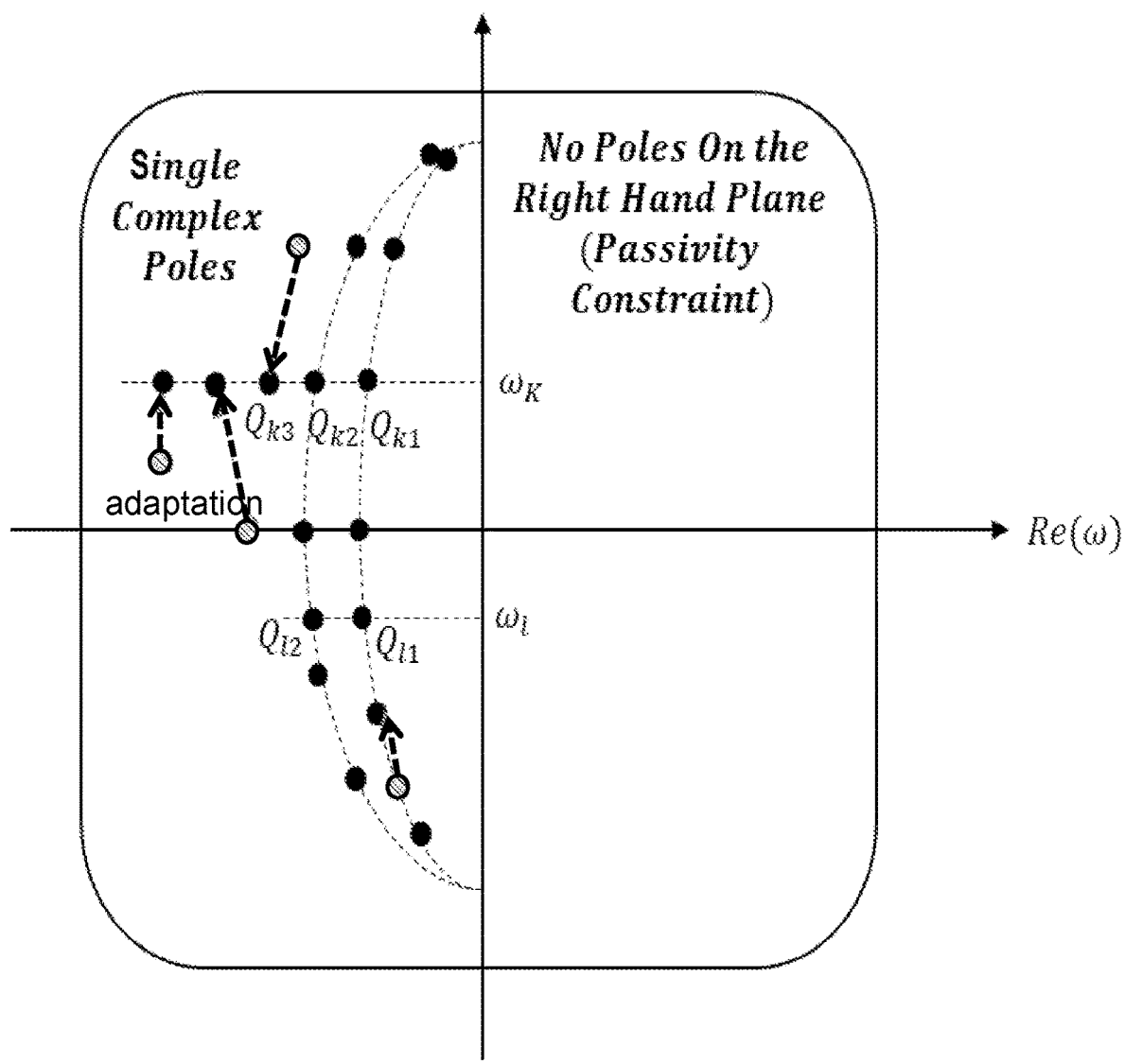
FIG. 5 is an image depicting a general pole adaptation plane.

There are many possible optional adaptation strategies for the core weights of NeurACore. Provided below is an example of adaptation for the communication/radar instantiation of NeurACore described in the previous section. The neural state space vector X captures in real time the spectrum of the input signal mixture, which can be used to adapt the frequencies of the poles to detect and track optimally the various signals in the input. FIG. 4 is a graph depicting how the poles cluster around two signals revealed by the neural state space vector. More generally, both the frequency and tunable quality factor Q of each pole can be adapted based on the state space spectrum and other variables, as depicted in FIG. 5. Thus, in one aspect and as shown in FIG. 3B the adaption module 302 allows a user to adapt the frequency and tunable quality factor Q of each pole.

(3.1.5) Complex-Valued Online Learning Module for Output Layer (i.e., the Global Learning Layer 304)

The purpose of the global learning layer 304 is to compute at each time step values for the complex-valued weights $\underline{C}$ for combining a preset number of time-delayed neural state vectors to predict the most likely next value of the input signal. To optimize the likelihood of the predicted input value, we use a gradient descent approach cast in differential form:

$$\dot{C}_I = -\mu I \nabla \underline{C}_I E\{\underline{C}_I, \underline{C}_Q\}$$

$$\dot{C}_Q = -\mu Q \nabla \underline{C}_Q E\{\underline{C}_I, \underline{C}_Q\}$$

where the weights for the K delayed state have the form $$C_I = \begin{bmatrix} C_{I11}(t) & \cdots & C_{I(K+1)1}(t) \\ C_{I12}(t) & \cdots & C_{I(K+1)2}(t) \\ \cdots & \cdots & \cdots \\ C_{I1N}(t) & \cdots & C_{I(K+1)N}(t) \end{bmatrix}$$

$$C_Q = \begin{bmatrix} C_{Q11}(t) & \cdots & c_{Q(K+1)1}(t) \\ C_{Q12}(t) & \cdots & C_{Q(K+1)2}(t) \\ \cdots & \cdots & \cdots \\ C_{Q1N}(t) & \cdots & C_{Q(K+1)N}(t) \end{bmatrix}$$

and $$E\{\underline{C}_I, \underline{C}_Q\} = \left(u_I(t) - \sum_{\substack{rows \\ columns}} \underline{C}_I(t-\tau_{pred}) \otimes \underline{X}_I(t-\tau_{pred}) + \sum_{\substack{rows \\ columns}} \underline{C}_Q(t-\tau_{pred}) \otimes \underline{X}_Q(t-\tau_{pred})\right)^2 +$$

$$\left(u_Q(t) - \sum_{\substack{rows \\ columns}} \underline{C}_I(t-\tau_{pred}) \otimes \underline{X}_Q(t-\tau_{pred}) - \sum_{\substack{rows \\ columns}} \underline{C}_Q(t-\tau_{pred}) \otimes \underline{X}_I(t-\tau_{pred})\right)^2 +$$

$$\lambda_I \sum_{\substack{rows \\ columns}} \underline{C}_I(t) \otimes \underline{C}_I(t) + \lambda_Q \sum_{\substack{rows \\ columns}} \underline{C}_Q(t) \otimes \underline{C}_Q(t) \text{ where}$$

$$\underline{X}_I = \begin{bmatrix} x_{I1}(t) & \cdots & x_{I1}(t-K\tau) \\ x_{I2}(t) & \cdots & x_{I2}(t-K\tau) \\ \cdots & \cdots & \cdots \\ x_{IN}(t) & \cdots & x_{IN}(t-K\tau) \end{bmatrix}$$

$$\underline{X}_Q = \begin{bmatrix} x_{Q1}(t) & \cdots & x_{Q1}(t-K\tau) \\ x_{Q2}(t) & \cdots & x_{Q2}(t-K\tau) \\ \cdots & \cdots & \cdots \\ x_{QN}(t) & \cdots & x_{QN}(t-K\tau) \end{bmatrix}.$$

(3.1.6) Output Update (Via the Neural Combiner 306)

The denoised output is determined by the Neural Combiner 306 by combining the K delayed states weighted by the C matrix elements obtained from the online Global Learning Layer module 304 described in the previous section:

$$y_I(t) = \sum_{\substack{rows \\ columns}} \underline{C_I} \otimes \underline{X_I}(t) - \sum_{\substack{rows \\ columns}} \underline{C_Q} \otimes \underline{X_Q}(t)$$

$$y_Q(t) = \sum_{\substack{rows \\ columns}} \underline{C_I} \otimes \underline{X_Q}(t) + \sum_{\substack{rows \\ columns}} \underline{C_Q} \otimes \underline{X_I}(t).$$

Thus, the neural combiner 306 combines the set of delayed neural state vectors with the weights of the Global Learning Layer module 304 to compute the output signal. The output signal is, for example, the detected and denoised signal.

(3.1.7) Real Time Hardware Implementation and Example Reduction to Practice

For further understanding, provided below are examples in which the NeurACore CSP has been reduced to practice using Matlab software simulations. It should be understood that when the NeurACore CSP is operating in real time on embedded hardware, such as FPGAs, there are unavoidable delays in the data stream that must be taken into account.

As noted above, the NeurACore CSP algorithm has been reduced to practice for a number of examples, using a Matlab software implementation for simulated environments. The NeuraCore CSP was evaluated for a variety of signals types that include a wide range of communication and radar waveforms. Further details of such examples are provided below.

(3.1.7.1) Quadrature Phase Shift Keying (QPSK) Signal De-Noising

One example used to demonstrate the NeurACore is a communication type signal with Quadrature Phase Shift Keying (QPSK) modulation. The QPSK modulation scheme uses phase modulation in which two bits are encoded into one symbol and the carrier is modulated through one of four possible phases, 45-, 135-, 225- and 315-degrees carrier phase shifts. QPSK provides a challenging scenario, as not only must the NeurACore relearn the waveform as the carrier phase transitions from symbol-to-symbol, but strict phase coherence must be maintained between the I and Q channels to increase the signal-to-noise ratio (SNR) and also get a low bit-error-rate (BER).

Figure 6A:
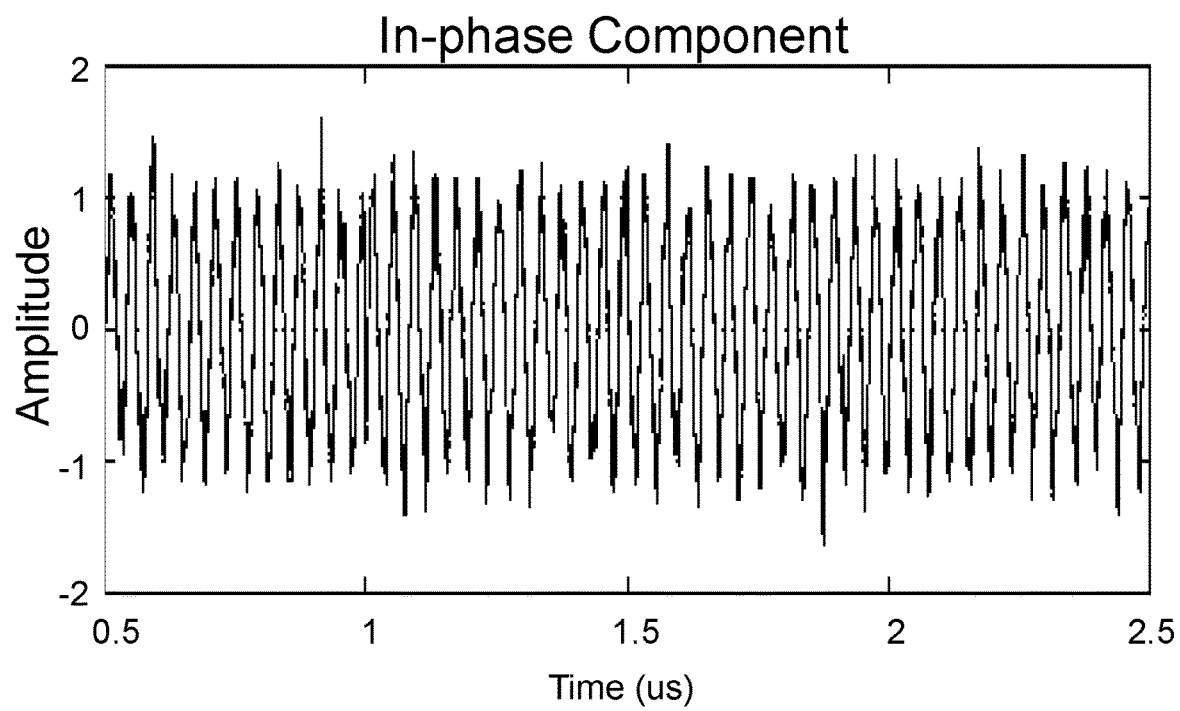
FIG. 6A is a plot depicting a noisy time domain QPSK signal with a 10 dB signal-to-noise ratio (SNR) (in-phase component)
Figure 6B:
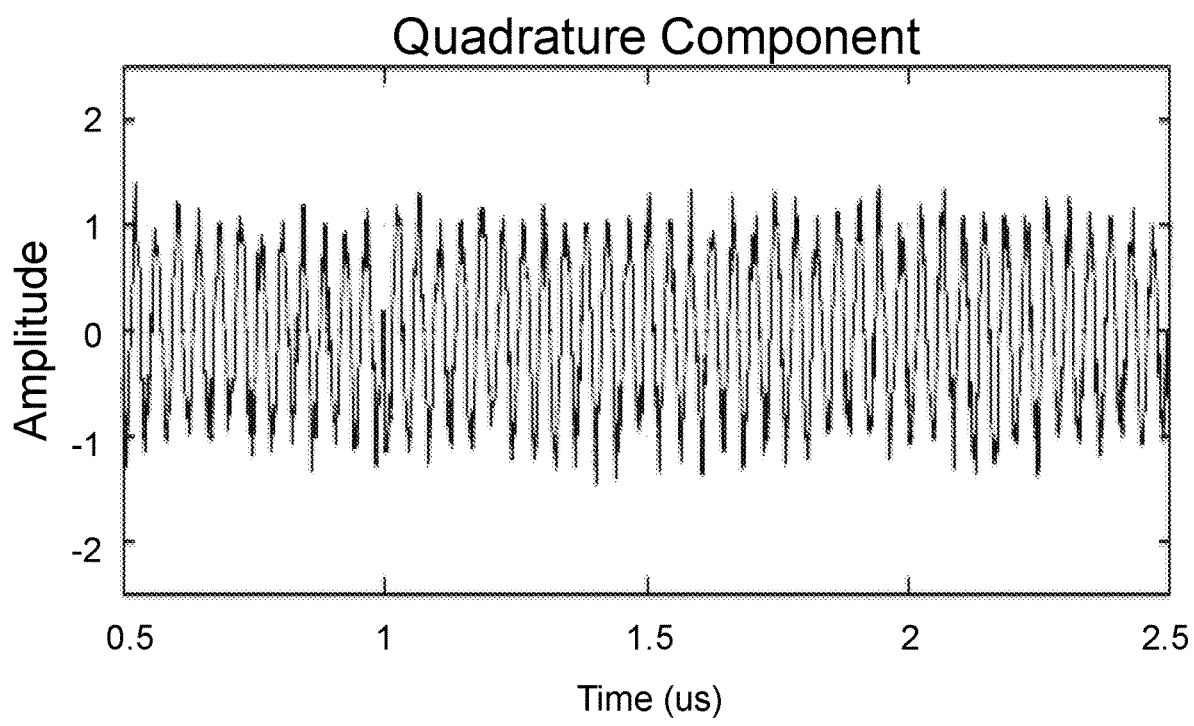
FIG. 6B is a plot depicting a noisy time domain QPSK signal with a 10 dB SNR (quadrature component)
Figure 6C:
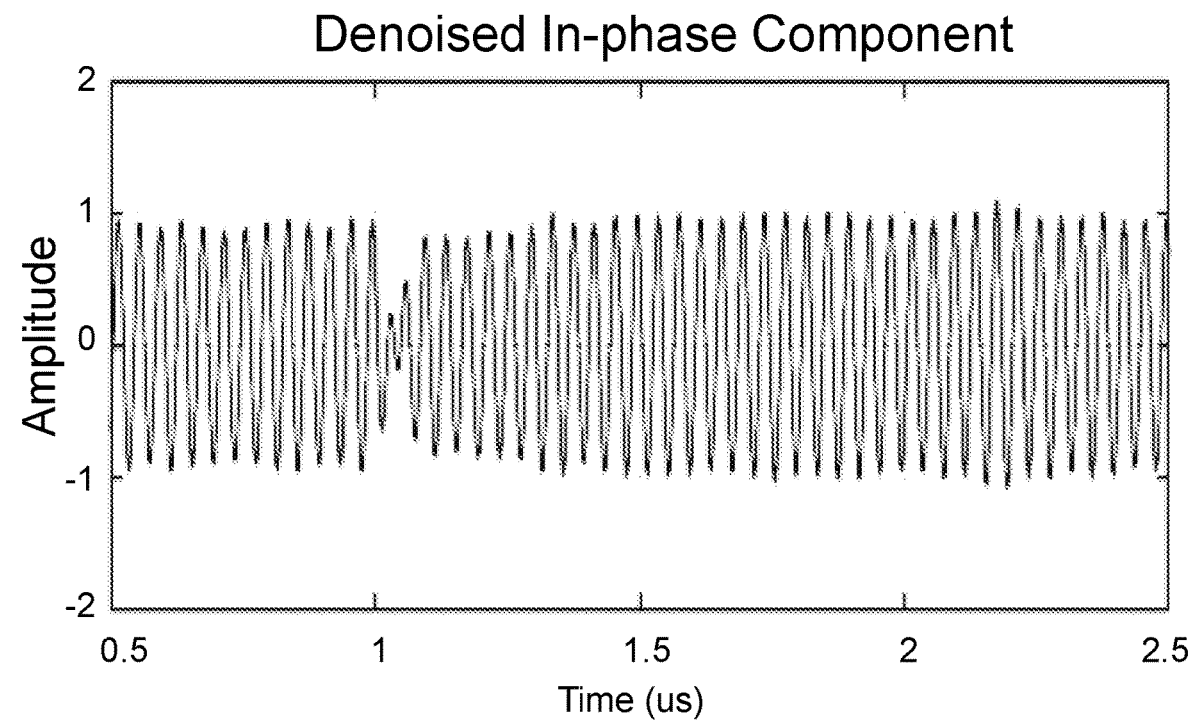
FIG. 6C is a plot depicting a resultant de-noised time domain QPSK signal (in-phase component)
Figure 6D:
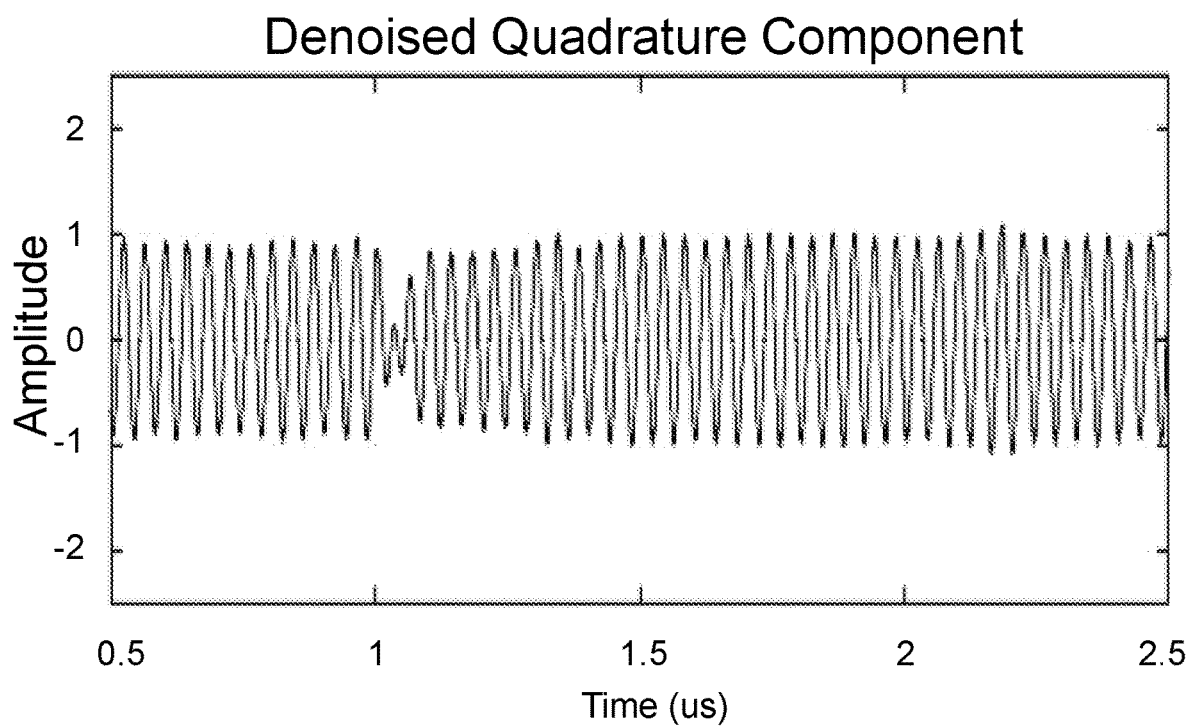
FIG. 6D is a plot depicting a resultant de-noised time domain QPSK signal (quadrature component)
Figure 7A:
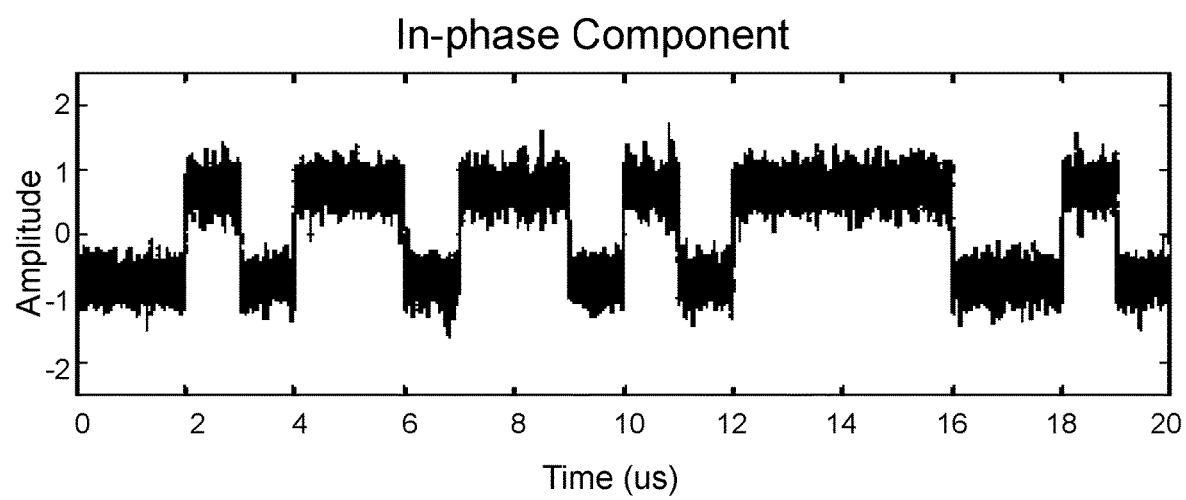
FIG. 7A is a plot chart depicting a noisy received signal (in-phase component) after demodulation.
Figure 7B:
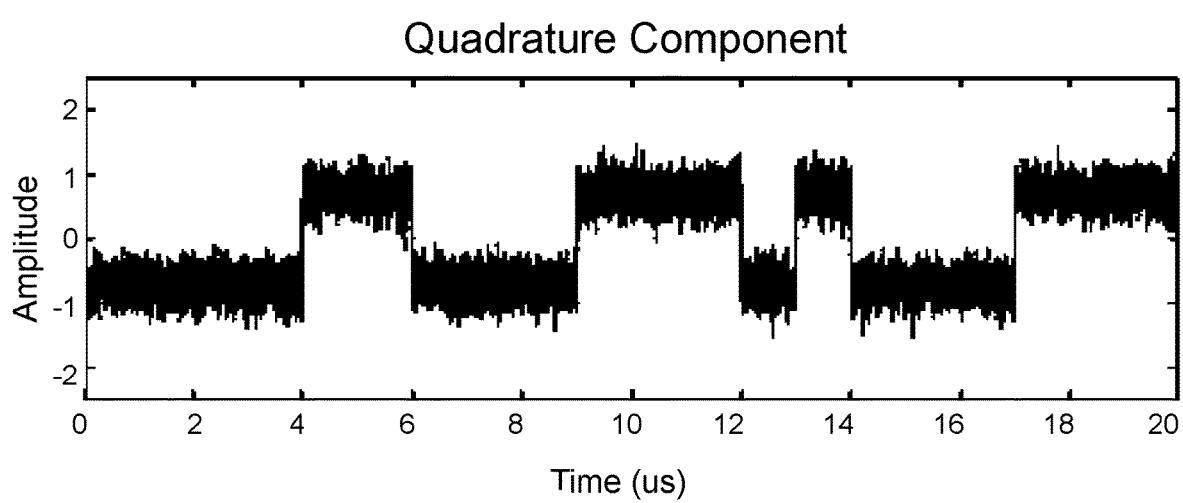
FIG. 7B is a plot chart depicting a noisy received signal (quadrature component) after demodulation.
Figure 7C:
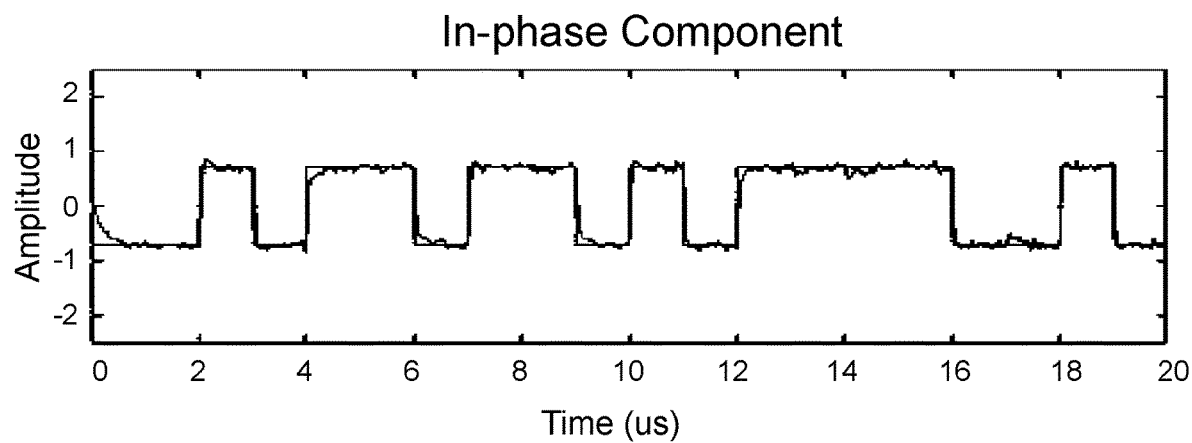
FIG. 7C is a plot chart depicting a de-noised received signal (in-phase component) after demodulation.
Figure 7D:
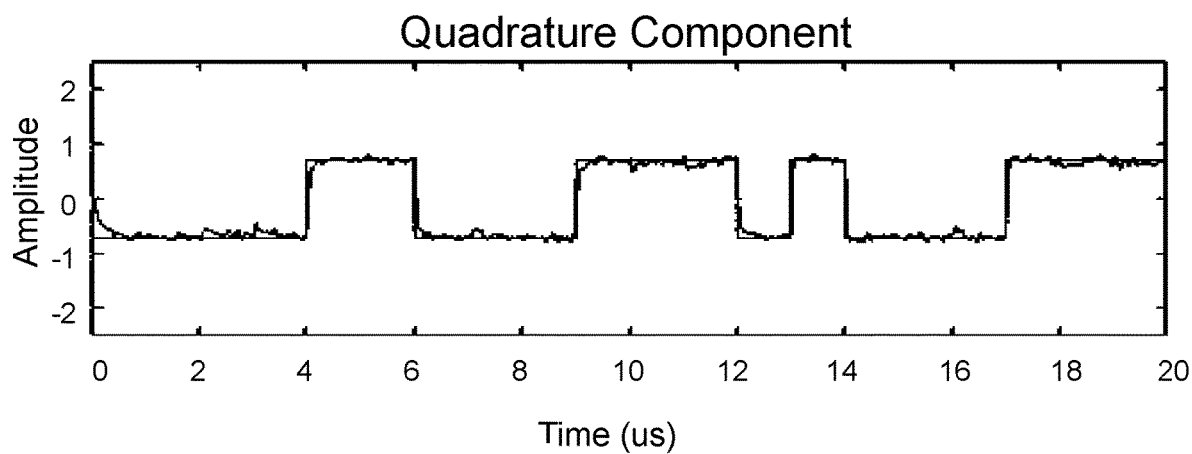
FIG. 7D is a plot chart depicting a de-noised received signal (quadrature component) after demodulation.
Figure 8A:
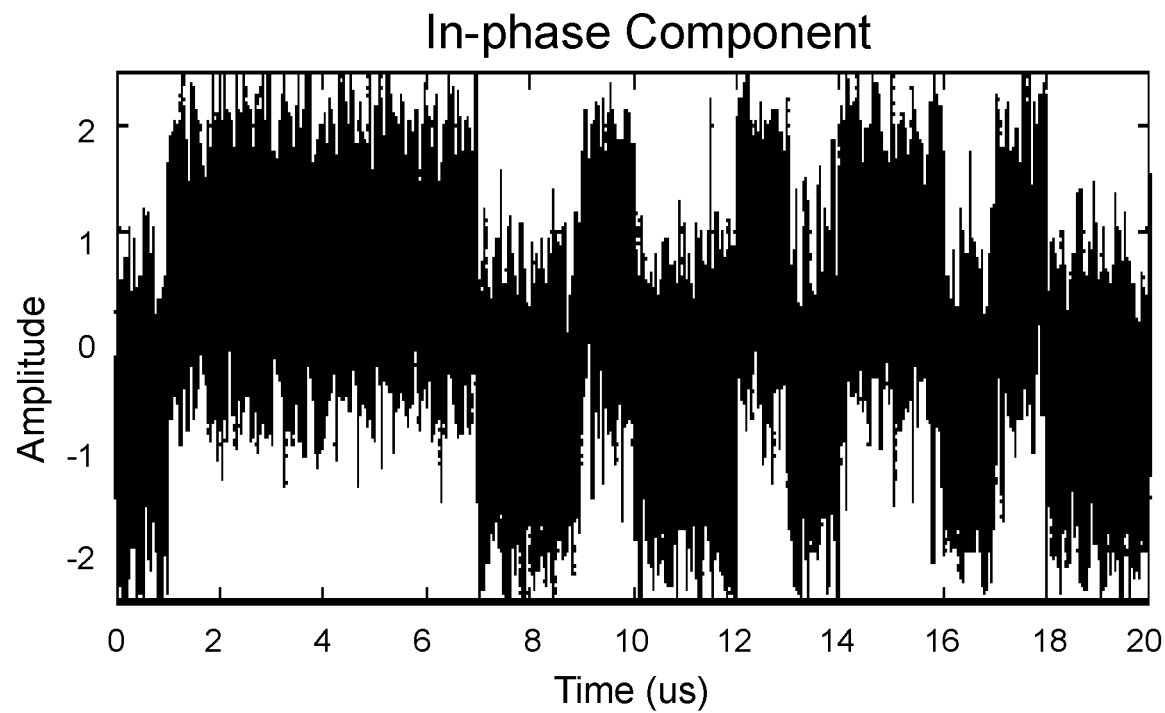
FIG. 8A is a time domain plot from the noisy received signal (in-phase component)
Figure 8B:
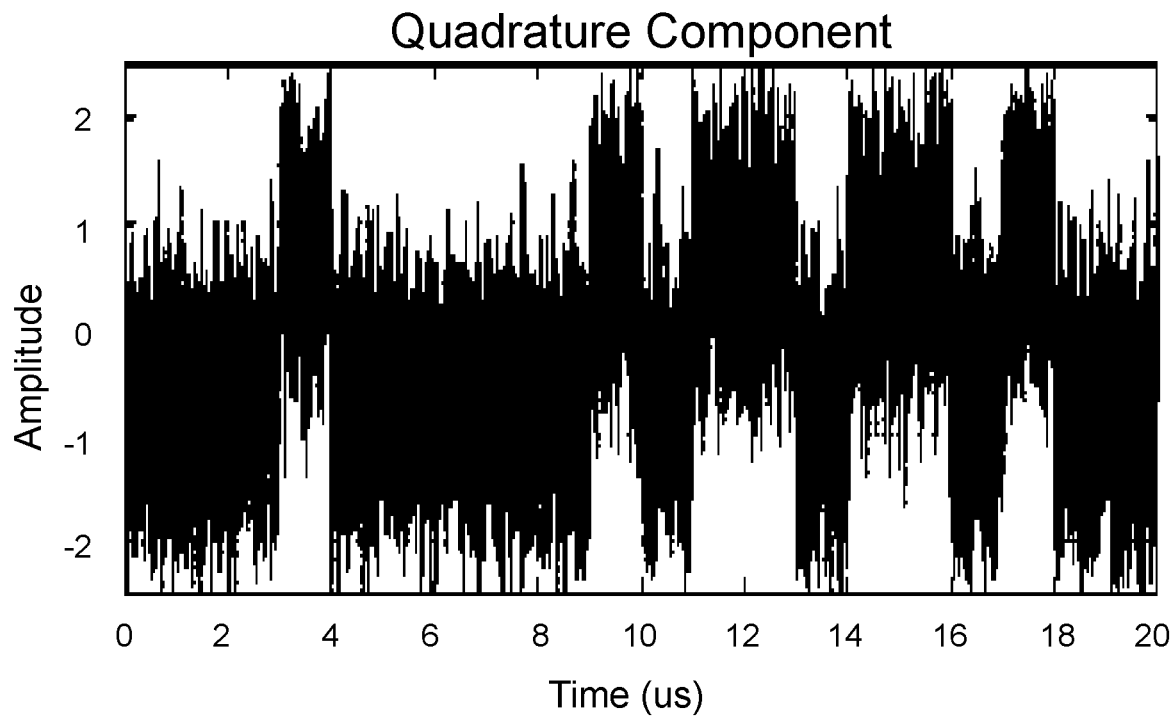
FIG. 8B is a time domain plot from the noisy received signal (quadrature component)
Figure 8C:
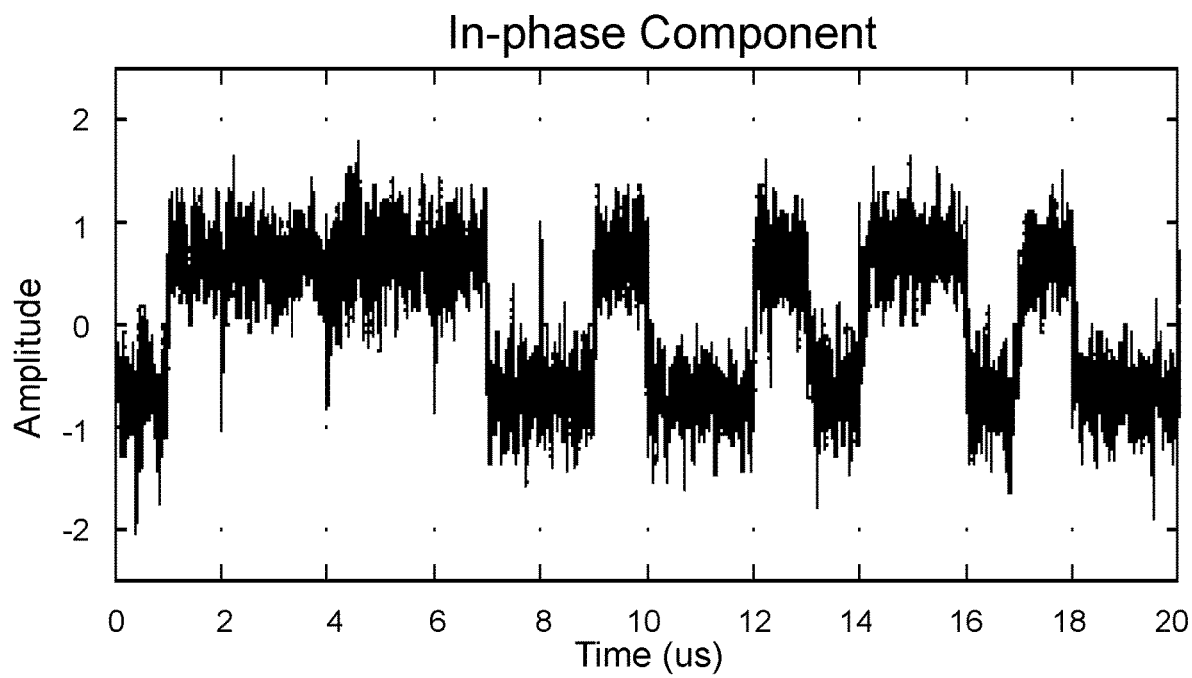
FIG. 8C is a time domain plot from the de-noised received signal (in-phase component), depicting significantly less in-band noise.
Figure 8D:
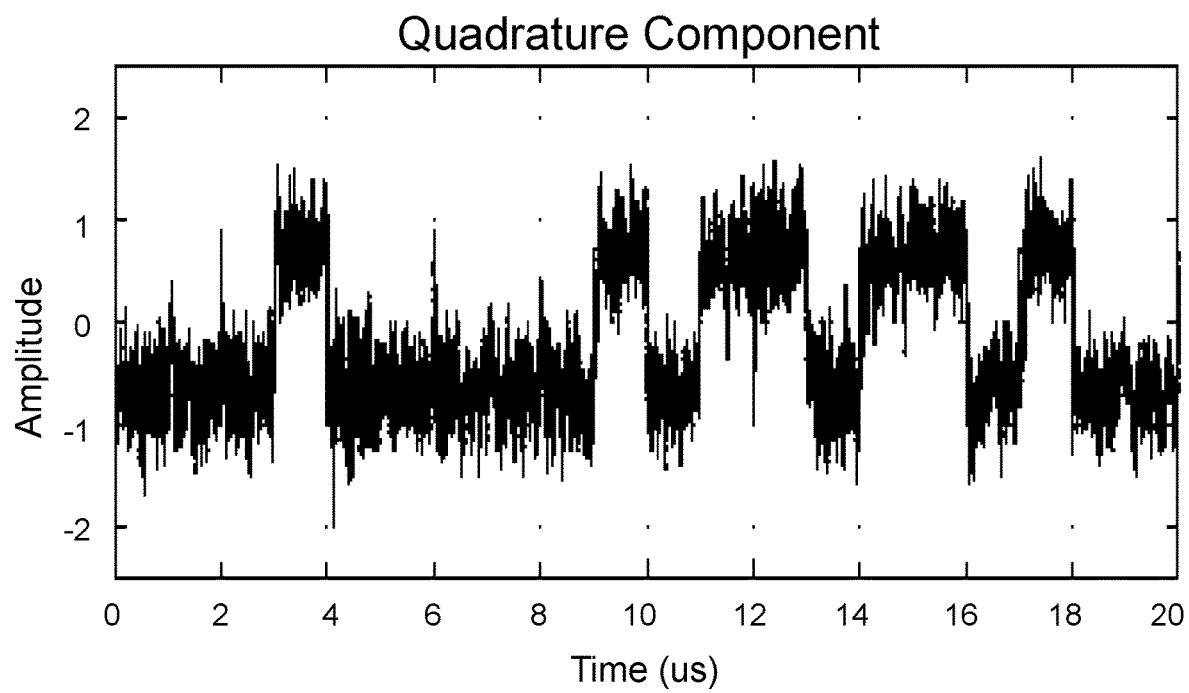
FIG. 8D is a time domain plot from the de-noised received signal (quadrature component), depicting significantly less in-band noise.

In the QPSK example, a random bit sequence is used to generate symbols with a symbol rate of 1 MSps or equivalent bit rate of 2 Mbps. The symbols are then up-converted and transmitted on a carrier of 25 MHz. With NeurACore processing a 500 MHz bandwidth from −250 MHz to 250 MHz, the carrier itself could be placed anywhere within the band. FIGS. 6A and 6B show a noisy QPSK signal transmitted with 10 dB SNR, depicting both an in-phase component (FIG. 6A) and a Quadrature component (FIG. 6B). The corresponding received signal after de-noising is depicted in FIGS. 6C and 6D for the in-phase and Quadrature components, respectively. The noise added to the transmitted signal is of Gaussian distribution.

After de-noising the received signal, the waveform is demodulated through a complex mixer, moving the data to baseband. FIGS. 7A through 7D depict the time domain plots for both the noisy and de-noised symbols of the in-phase and quadrature components. Both components are plotted against the original data sequence. The de-noised data sequence (depicting in FIGS. 7C and 7D) show significant decrease in-band noise, resulting in a waveform that follows closely the original data sequence.

To further push the limits of NeurACore, a frequency hopping spread spectrum (FHSS) with QPSK modulation scenario was created. Using a FHSS over an ultra-wideband would demonstrate real-time de-noising of the processing bandwidth without the latency of a conventional channelizer approach. The FHSS was set up to cover 350 MHz using 241 chips with a chip rate of 2 mega chips per second (Mcps). FIGS. 8A through 8D depict the time domain plots from the noisy received signal (FIGS. 8A and 8B) and the de-noised received signal (FIGS. 8C and 8D) with significantly less in-band noise.

Figure 9A:
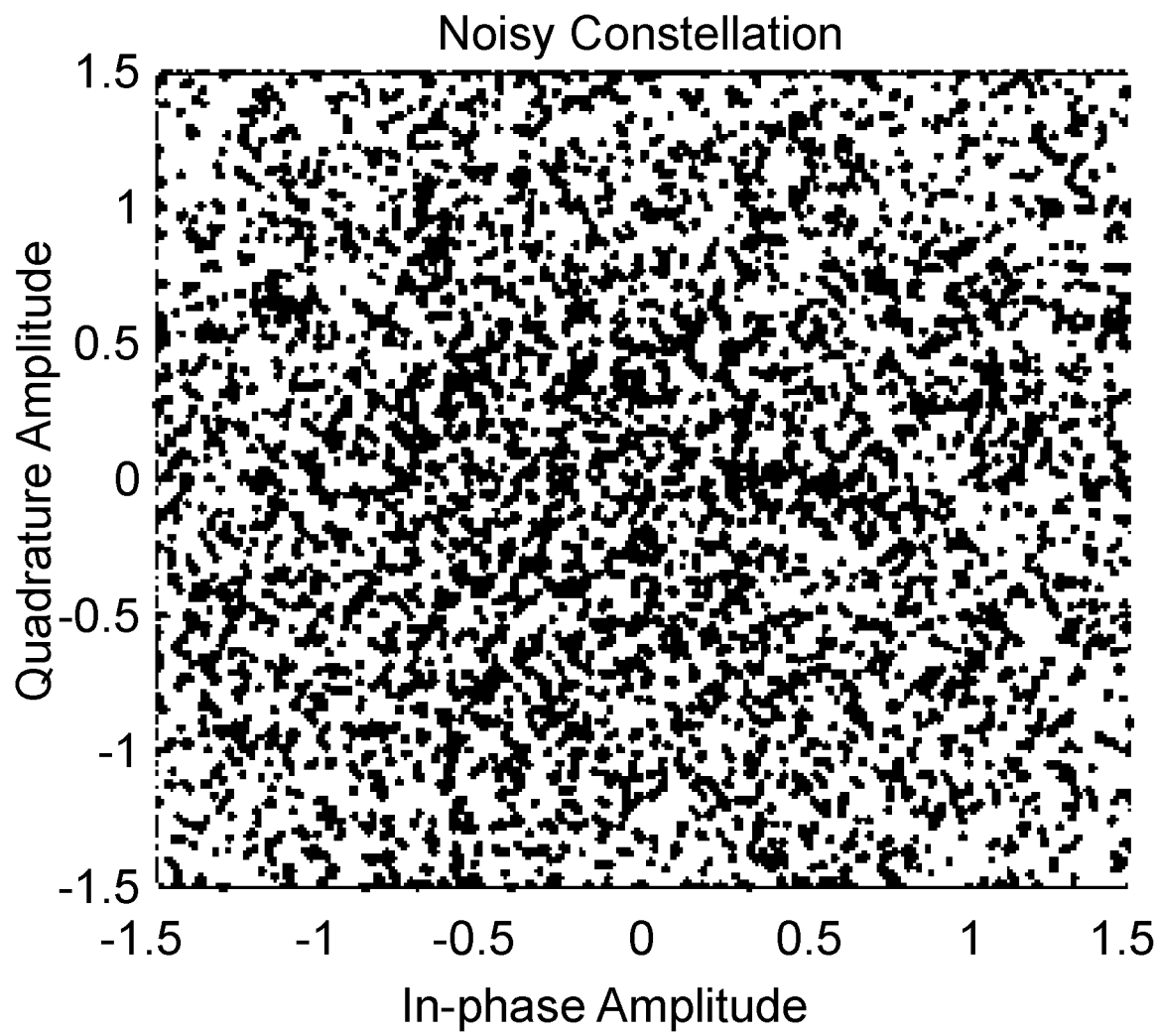
FIG. 9A is a constellation diagram before denoising.
Figure 9B:
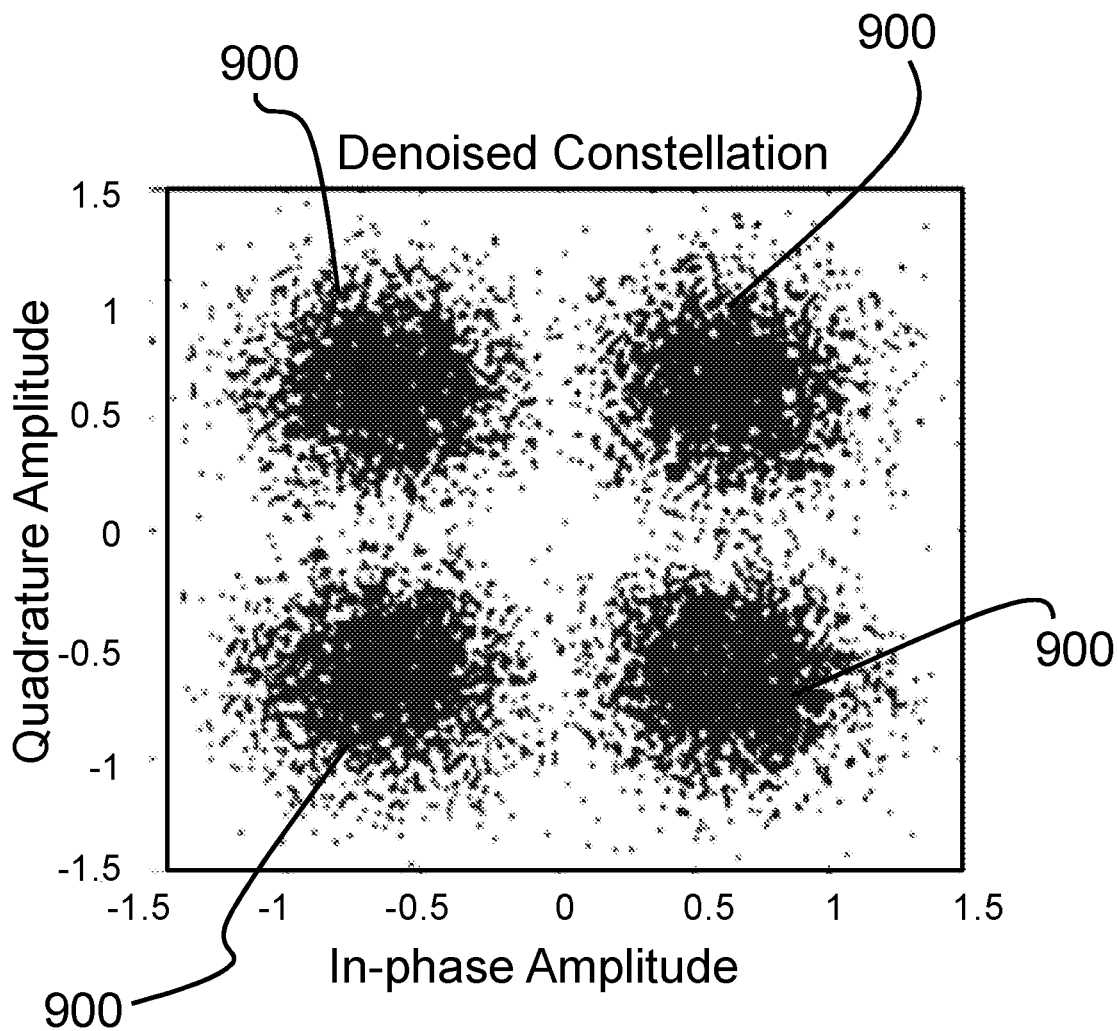
FIG. 9B is a constellation diagram after denoising, showing a de-noising SNR improvement of 14 dB.

At 0 dB SNR, there is no clear decision region when examining the constellation plot in FIG. 9A (as the plots create no clear pattern or decision region). However, after de-noising, the decision regions 900 are clearly visible in the constellation plot depicted in FIG. 9B, demonstrating the denoising effectiveness of NeurACore for very low SNR signals distributed over an ultra-wideband. For example, the error vector magnitude EVM is 35.90, while the SNR is 8.9 dB, showing an SNR improvement of 14.01 dB.

(3.1.7.2) Denoising Chirped RF Waveform with Frequency Adaptation

Figure 11A:
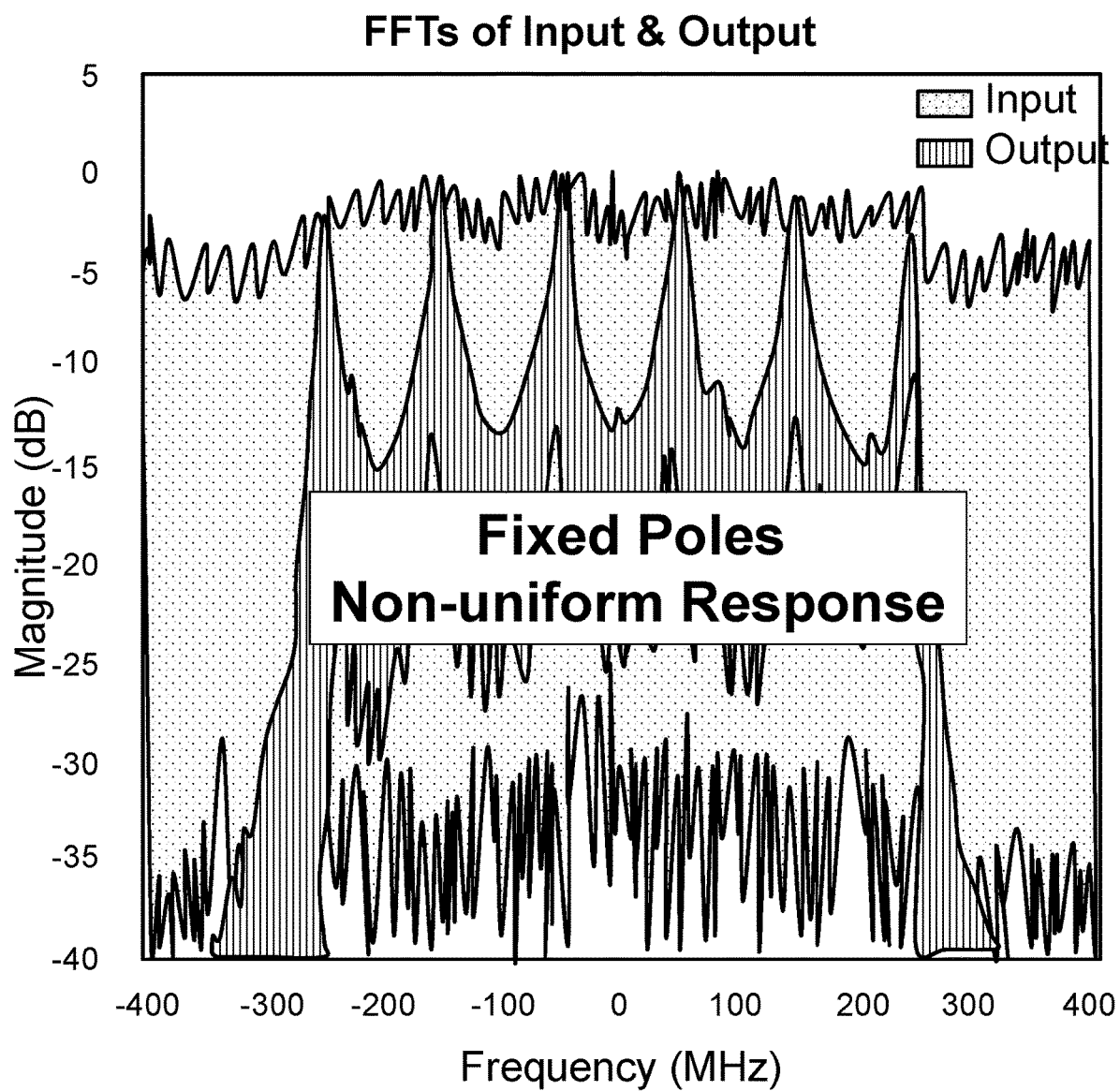
FIG. 11A is a diagram depicting a spectral response of the filter with and without pole adaption, depicting an uneven response with six fixed poles.
Figure 11B:
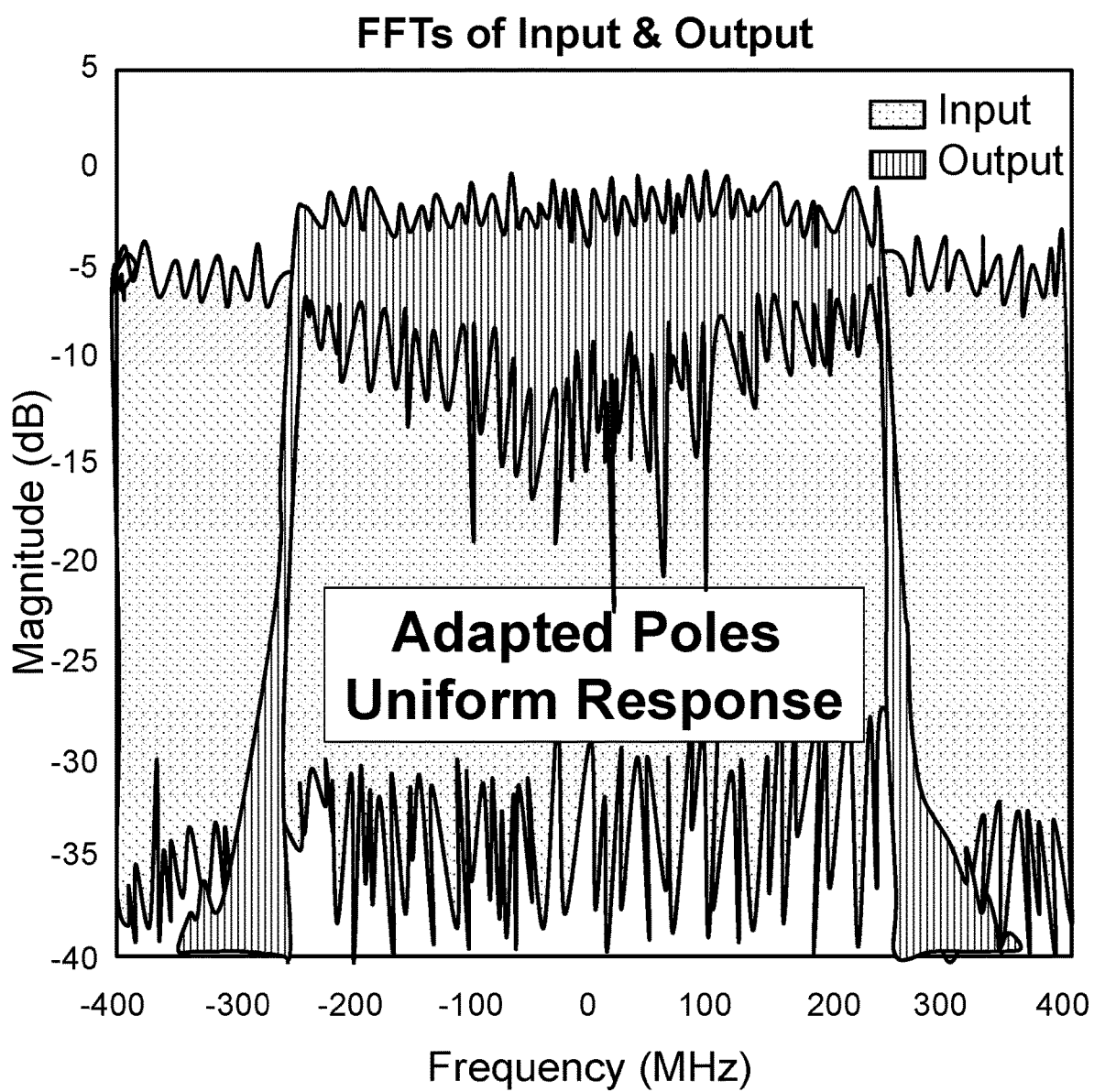
FIG. 11B is a diagram depicting a spectral response of the filter with and without pole adaption, depicting a uniform response with six frequency-adapted poles.

Another example as shown in FIG. 11B is presented as a frequency adaptation for the communication/radar instantiation of NeurACore. The poles of the state-space vector capture the instantaneous spectrum of the input signal(s). In order to resolve this spectrum with useful accuracy, the poles of the system need to be placed sufficiently close to each other in frequency. But in the case of wide bandwidth systems, this means having to use a large number of poles to resolve accurately all signal frequencies of interest. The resulting high number of poles makes the algorithm prohibitively expensive for embedded hardware operation. Thus, in order to reduce the number of required poles without sacrificing spectral resolution, the core adaptation feature of NeurACore is leveraged to adapt pole frequencies to track the input signals. Two validation cases are presented below, one for tracking a wideband chirp signal and another to separate two signals that are very close in frequency.

Figure 10A:
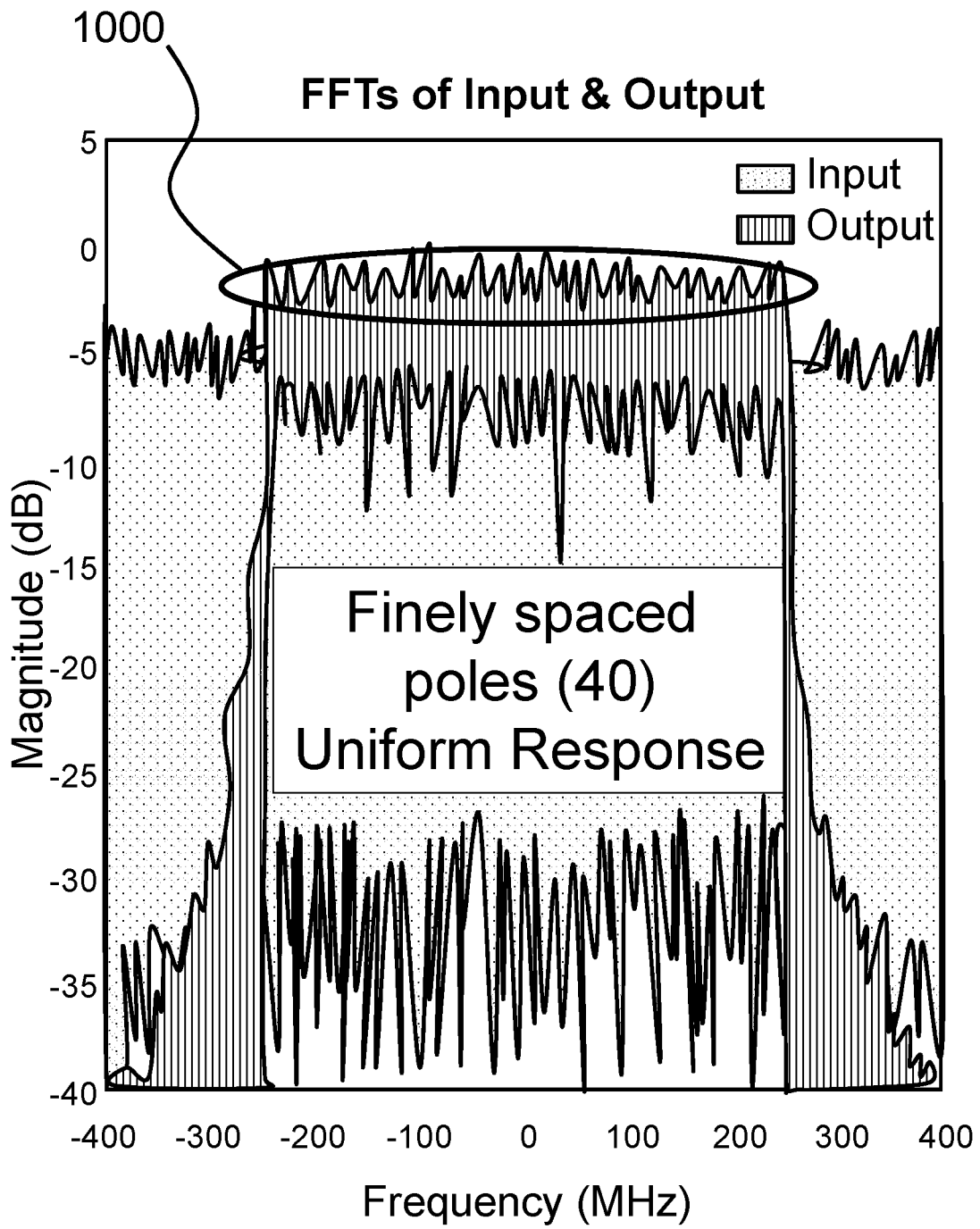
FIG. 10A is a diagram depicting a spectral response of a filter as a function of the number of poles, showing a flat response with closely spaced poles.
Figure 10B:
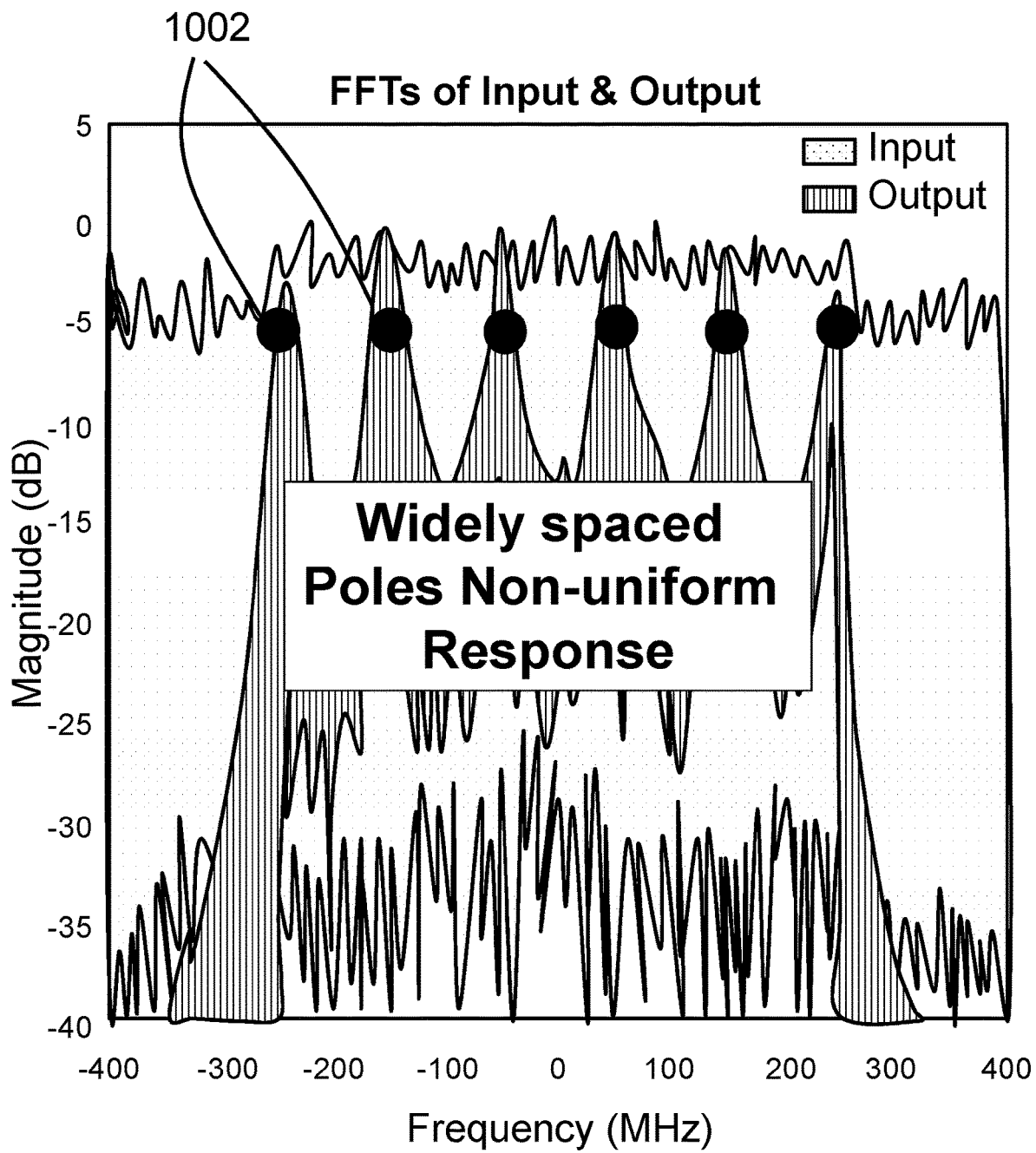
FIG. 10B is a diagram depicting a spectral response of a filter as a function of the number of poles, showing an uneven response with a coarse distribution of poles.

It is first illustrated how too few coarsely spaced poles negatively affect the frequency response of the CSP filter to a wideband chirp signal input. In FIG. 10A, 40 finely spaced poles 1000 produce a very flat spectral response for the filter. However, with only six poles 1002, the non-uniform response shown in FIG. 10B is obtained because the poles are less sensitive to input frequency components that are too far from their resonant frequency. But with adaptation, the poles move towards spectral energy peaks, as illustrated in FIG. 10B, so that the system can track the input signal and achieve uniform system response.

The effectiveness of frequency adaptation for a wide bandwidth chirp signal with an SNR of −3 dB is demonstrated by comparing the denoiser outputs with and without adaptation. FIGS. 11A and 11B show how adaptation flattens the frequency response of the CSP. In FIG. 11A, the output drops by over 10 dB when the frequency of the chirp is in between the resonant frequencies of the widely spaced poles because the system is barely detecting the signal. Whereas when the frequencies of the poles are adapted, there is always a pole tracking the chirp frequency, resulting in the uniform response of FIG. 11B.

Figure 12:
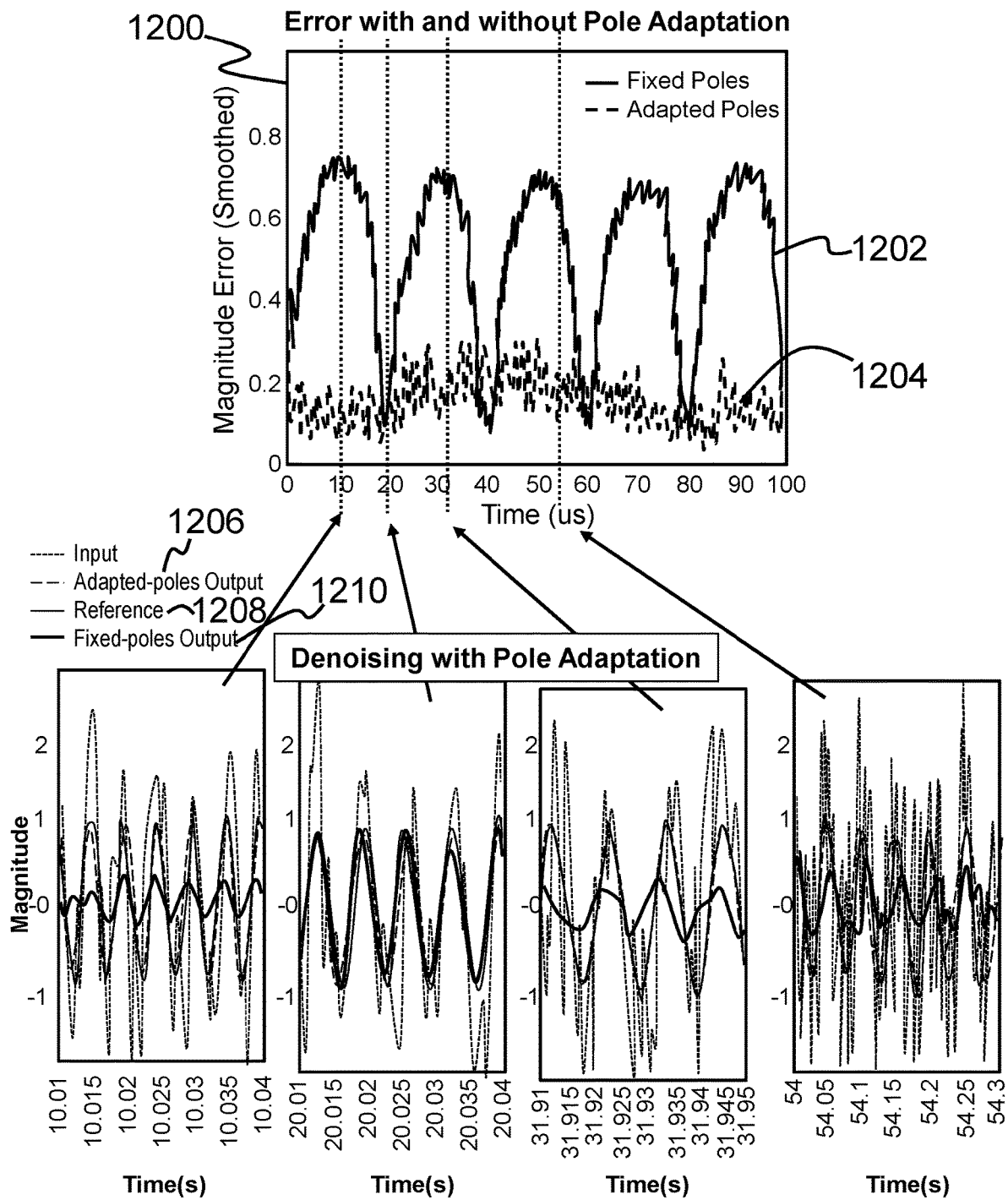
FIG. 12 is a comparison of the output signal and error for systems with fixed and adapted pole distributions.

FIG. 12 is used to compare the output signals and their errors. The top plot 1200 shows how the output error increases away from the fixed poles 1202, whereas with pole adaptation, the error 1204 remains uniform and significantly lower compared to the fixed pole 1202 error distribution. The bottom plots in FIG. 12 are segments from the output (at various time intervals) showing how the adapted system output 1206 is much closer to the reference chirp signal 1208 than the output produced by the fixed pole system 1210. This result demonstrates how the efficiency of NeurACore adaptation reduces NeurACore's matrix/vector sizes, thus enabling implementation on low C-SWaP platforms/hardware.

(3.1.7.3) Blind Source Separation with NeurACore Adaptation

Figure 13A:
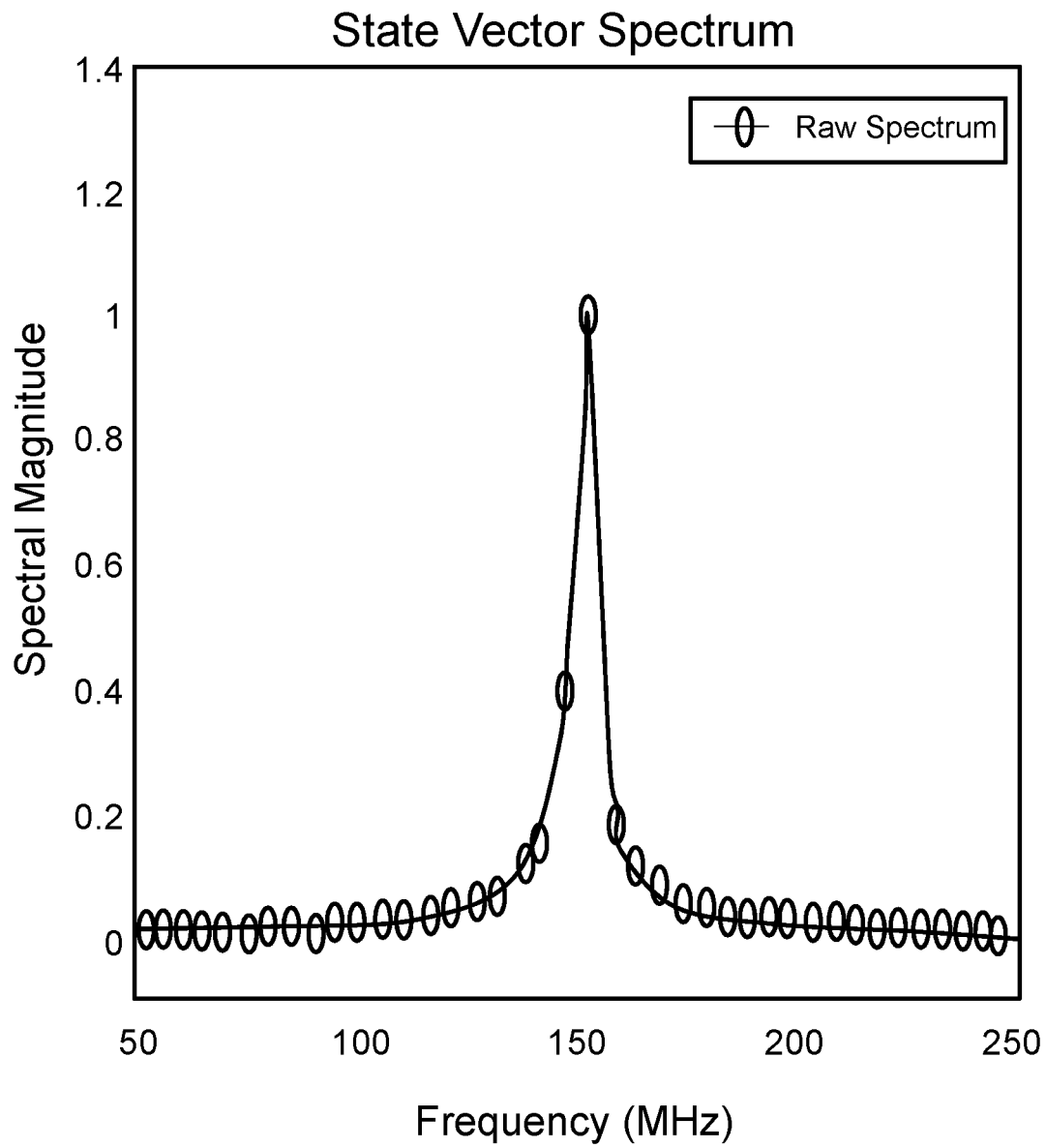
FIG. 13A is a chart depicting signal separation with pole adaptation, depicting that a fixed distribution cannot distinguish the two signals.
Figure 13B:
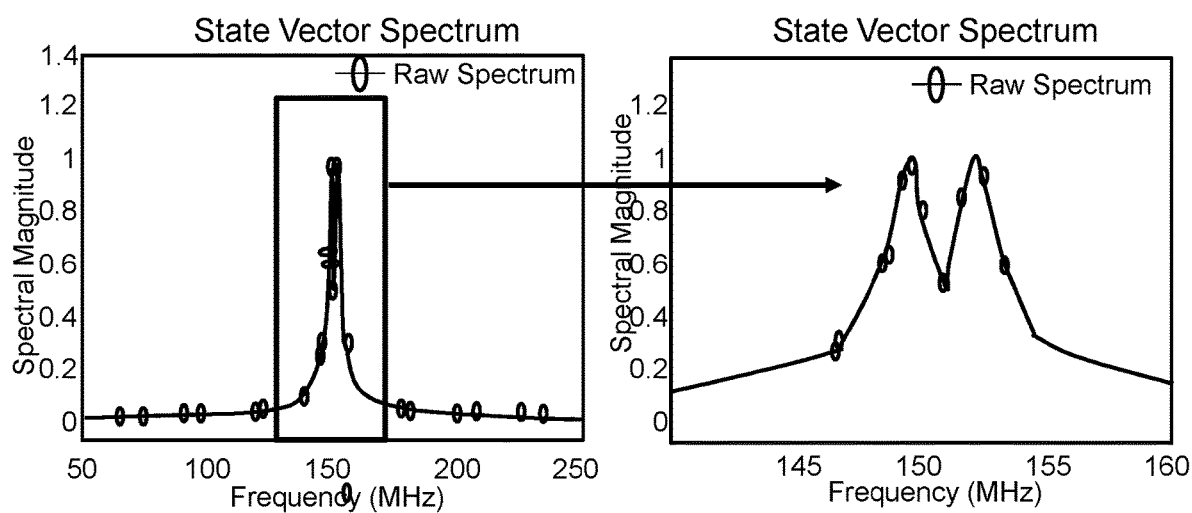
FIG. 13B is a chart depicting signal separation with pole adaptation, depicting that adaptation reveals two signals separated by 2 MHz.

In order for a wideband system to separate two signals that are very close in frequency, the state space vector would require far too many poles to be practical to run on SWaP-constrained real-time hardware. It was demonstrated how NeurACore's pole frequency adaptation can help separate two signals very close in frequency. FIG. 13A shows how a fixed pole distribution cannot distinguish between two signals separated by 2 MHz over a spectrum of 200 MHz, whereas pole adaptation (FIG. 13B) clearly reveals the two signals separated by 2 MHz.

(3.2) Physics Enhanced Neuromorphic Adaptive Controller

As noted above, the present disclosure also provides a Physics Enhanced Neuromorphic Adaptive Core (NeurACore) Controller, which is a system controller incorporating prior system knowledge with real-time learned system characteristics to effect desired output system behavior. Examples of such a system in which the Physics Enhanced NeurACore Controller can be implemented include an autonomous driving vehicle, automated assembly components (e.g., robotic arm), etc.

Figure 14:
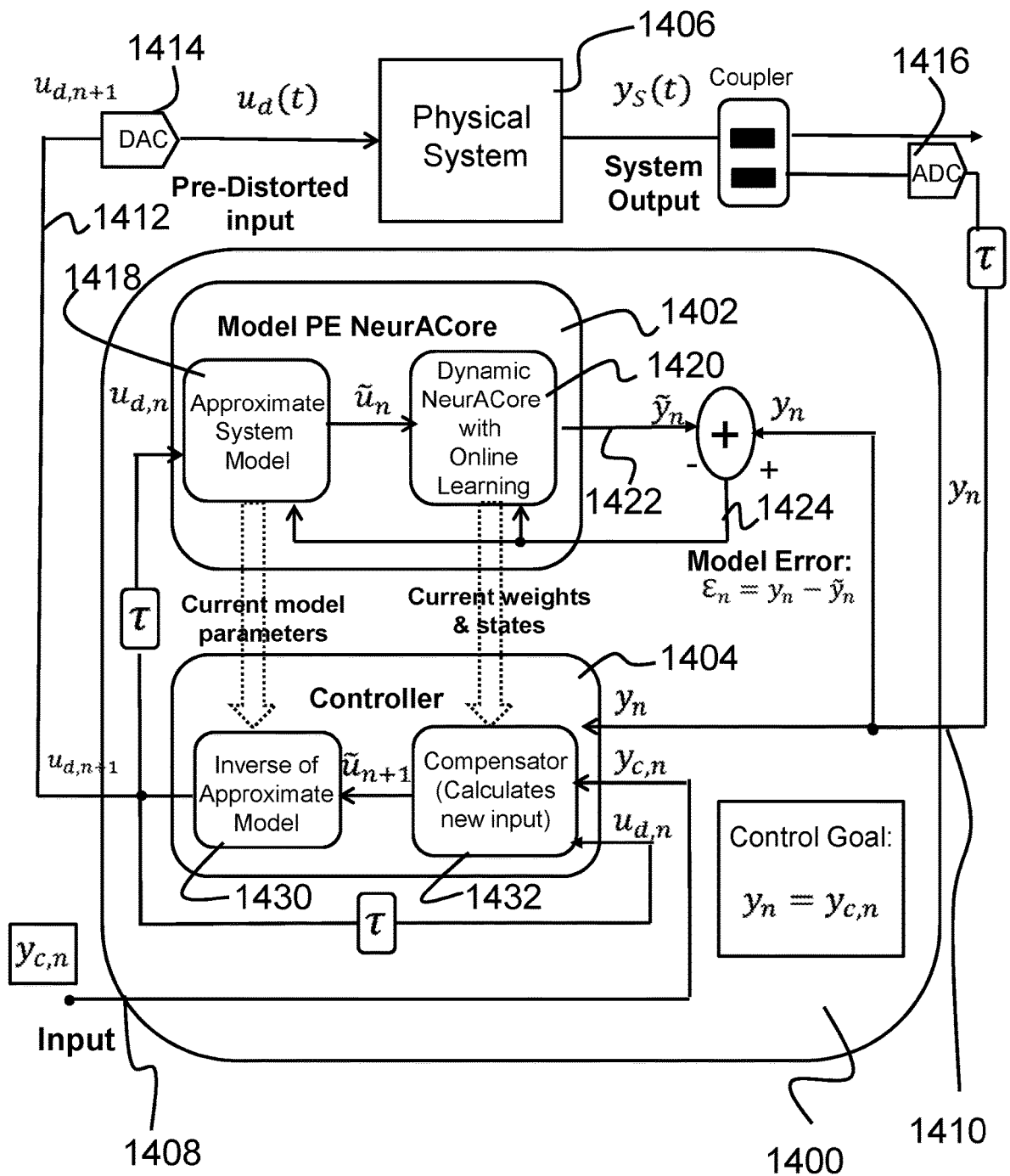
FIG. 14 is a block diagram of a controller according to various embodiments of the present invention.
Figure 15A:
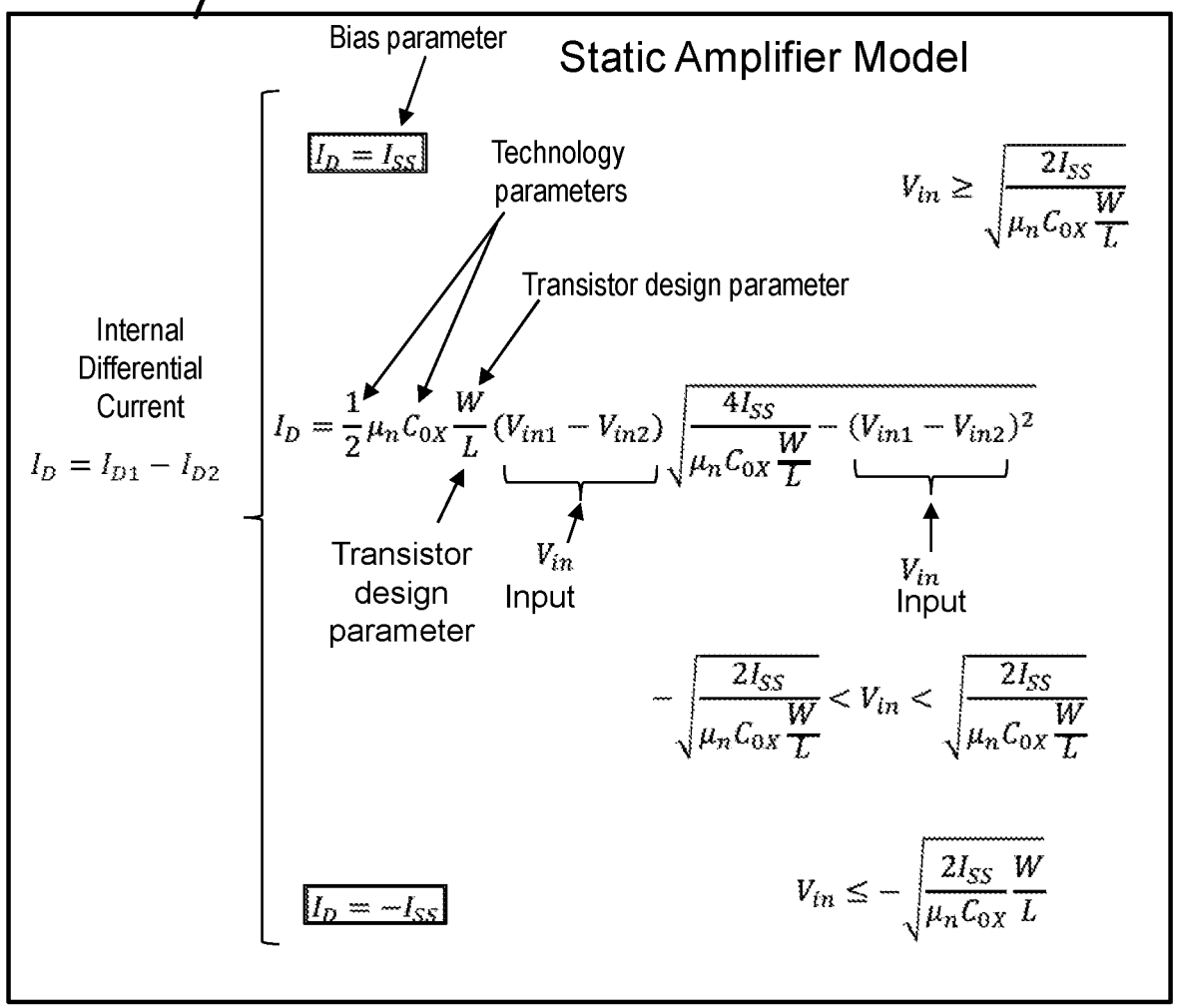
FIG. 15A is an illustration of an example static amplifier model according to various embodiments of the present invention.
Figure 15B:
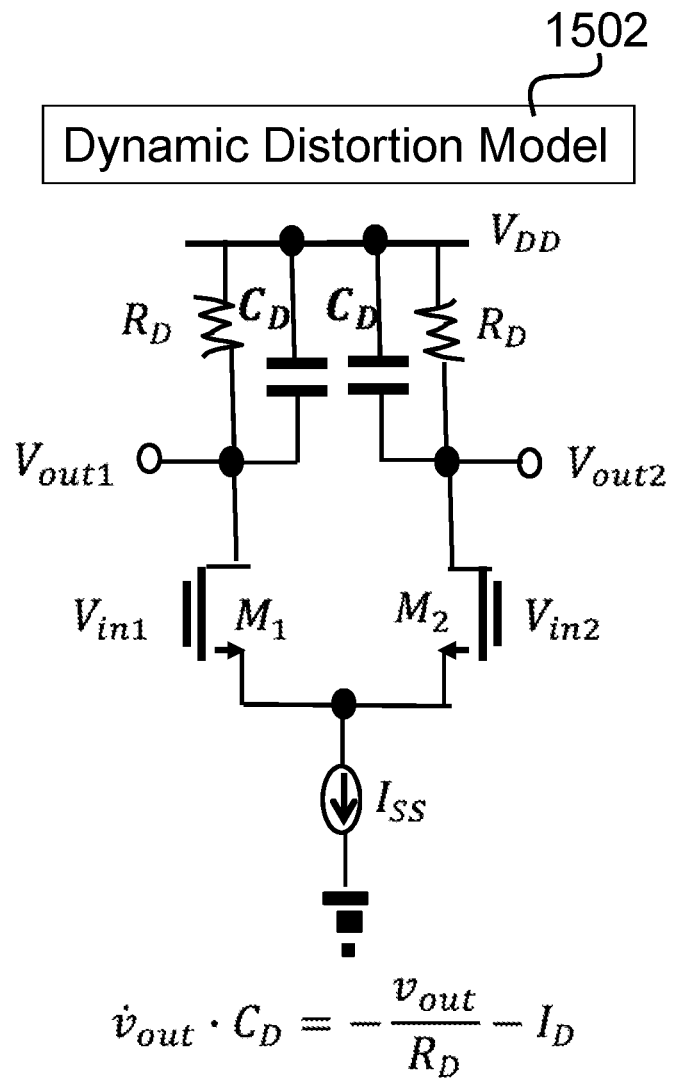
FIG. 15B is an illustration of dynamic distortion model according to various embodiments of the present invention.

A block diagram of the controller is shown in FIG. 14. In the block diagram, the Physics Enhanced NeurACore Controller 1400 is shown as comprised of a model Physics-Enhanced NeurACore 1402 and a controller 1404, both of which are coupled to a physical system 1406 (e.g., autonomous vehicle, etc.) to be controlled. The inputs to the Physics Enhanced NeurACore Controller 1400 are the desired output 1408 of the physical system 1406 and the actual output 1410 of the physical system 1406; the output 1412 of the Physics Enhanced NeurACore Controller 1400 is the pre-distorted signal to control the physical system 1406. In some embodiments and as shown, a digital-to-analog (DAC) 1414 converter (DAC) and an analog-to-digital (ADC) 1416 converter are used to convert the signal between digital and analog as necessary.

The Model Physics Enhanced NeurACore 1402 comprises an approximate (physics-based) system model 1418 and Dynamic NeurACore 1420 with Online Learning (as described above Section 3.1 and illustrated in FIG. 3). As shown in FIG. 14, the two models are connected in series, though it is also possible to couple the two in reverse order, or to couple the two models in parallel in an enlarged state space. The approximate system model is a set of differential, differential-algebraic, or other equations describing the ideal or nominal operation of the physical system.

An example of the approximate physics model 1418 is shown in FIG. 14 through 23. As shown in FIGS. 15A and 15B, the "real" amplifier model is a combination of static nonlinear amplifier model 1500 and dynamic distortion model 1502 derived from parasitic capacitors. Referring again to FIG. 14, the model Physics Enahnced NeurACore 1402 is a combination of the approximate static nonlinear amplifier model (physics model) 1502 and dynamic NeurACore 1420 with online learning. During algorithm testing and characterization, the parameters in the approximate model 1418 are purposely detuned from the model parameters used in the "real" amplifier 1500.

The Dynamic NeurACore 1420 with Online Learning is a linear state-space model consisting of adaptable input layer (B in equations below), neuromorphic core poles (A), and output layer (C and D). The Dynamic NeurACore 1420 is described by the equations:

$$\dot{x}=Ax+Bu$$

$$y=Cx+Du.$$

The difference of the Model Physics Enhanced NeurACore output 1422 and system output 1410 provides an error signal 1424 that is used in the update of the Model Physics Enhanced NeurACore 1402. The magnitude of the error signal 1424 is minimized in real time by a gradient descent algorithm that adjusts approximate system model parameters, and input, neuromorphic core, and output layer weights in the Dynamic NeurACore 1420.

(3.2.1) Online Model Learning Via Gradient Descent

This section provides a description of the short-term prediction method that the invention uses for online model learning. Given that delay-embedded observations of the NeurACore 1420 states can effectively model dynamical system behavior, the invention leverages the time history of these NeurACore 1420 state variables to perform short-term predictions of the observations. The invention uses the NeurACore 1420 to learn the prediction function F:

$$\hat{u}_a(t+\tau)=F[u_0(t)].$$

The weights of the output layers are adapted via the gradient descent learning algorithm described below. The gradient descent learning algorithm is based on short-time prediction of the input signal, seeking to represent the output as a linear combination of historical NeurACore 1420 states.

The dynamic NeurACore 1420 satisfies the following set of coupled ordinary differential equations (ODE):

$$\dot{\underline{x}}(t) = \underline{A}\underline{x}(t) + Bu_0(t)$$

$$y(t) = \sum_{k=1}^{K+1} \underline{c}_k(t)^T \underline{x}(t-(k-1)\tau) + \underline{d}(t)^T \underline{u}(t),$$

$$\text{where } \underline{u}(t) \doteq [u_0(t), u_0(t-\tau), \dots, u_0(t-K\tau)]^T,$$

where u(t) is an input vector formed out of the delayed version of a scalar input $u_0(t)$.

To perform short-time prediction of the input signal, the invention (i.e., NuerACore) uses an online gradient descent algorithm. The idea is to enforce exact prediction of the current time point that is used in the state update equation. The predicted input value at time (t+τ) is calculated from the current value of the output weights ($\underline{c}_k(t)$, $\underline{d}(t)$) and the current and past values of the NeurACore states ($\underline{x}$) and the input (u). The quadratic error function to be minimized is given by:

$$E[\underline{c}_1, \dots, \underline{c}_{K+1}, \underline{d}] \doteq [u_0(t) - \tilde{y}(t-\tau)]^2 + \lambda_c \sum_{k=1}^{K+1} \|\underline{c}_k(t)\|^2 + \lambda_d\|\underline{d}(t)\|^2,$$

where $\lambda_c$ and $\lambda_d$ are parameters that weight the importance of the output weights $$\{\underline{c}_k\}_{k=1}^{K+1}$$

and $\underline{d}$, and $$\tilde{y}(t-\tau) = \sum_{k=1}^{K+1} \underline{c}_k(t)^T \underline{x}(t-k\tau) + \underline{d}(t)^T \underline{u}(t-\tau).$$

Note that $\tilde{y}(t-\tau)$ is the delayed output expressed by the delayed valued of $\underline{x}$ and $u$ and the current values of the output weights $$\{\underline{c}_k\}_{k=1}^{K+1}$$

and $\underline{d}$, and thus in general $\tilde{y}(t-\tau) \neq y(t-\tau)$. However, this approximation is reasonable, and allows the system to not require storage of time histories of output weights, facilitating more efficient hardware implementation.

To minimize the quadratic error $E[\underline{c}_1, \ldots, \underline{c}_{K+1}, \underline{d}]$, the gradients of $E[\underline{c}_1, \ldots, \underline{c}_{K+1}, \underline{d}]$ are computed with respect to $$\{\underline{c}_k\}_{k=1}^{K+1}$$

and $\underline{d}$. Based on these gradients, the weight updates to $\{\underline{c}_K(t)\}_{k=1}^{K+1}$ and $\underline{d}(t)$ satisfy the following ordinary differential equations (ODEs):

$$\dot{\underline{c}}_k(t) = g_c \underline{c}_k(t) + \mu \tilde{\varepsilon}(t) \underline{x}(t-k\tau), k=1,2,\ldots,K+1$$

$$\dot{\underline{d}}(t) = g_d \underline{d}(t) + \mu_d \tilde{\varepsilon}(t) \underline{u}(t-\tau),$$

where $g_c = 2\lambda_d$ and $g_d = 2\lambda_d$ is the "forgetting" rates with respect to $$\{\underline{c}_k\}_{k=1}^{K+1}$$

and $\underline{d}$, $\mu_c$ and $\mu_d$ are the learning rates with respect to $$\{\underline{c}_k\}_{k=1}^{K+1}$$

and $\underline{d}$, and $\tilde{\varepsilon}(t) \approx u_0(t) - \tilde{y}(t-\tau)$ is the error signal.

For nominal system operation, adjustment of the approximate system model parameters may not be necessary, with the Dynamic NeurACore adaptability sufficient to capture small system perturbations. However, for large system changes, an approximate system model with learned parameters significantly enhances performance, as shown in the linear amplifier example below.

Figure 16:
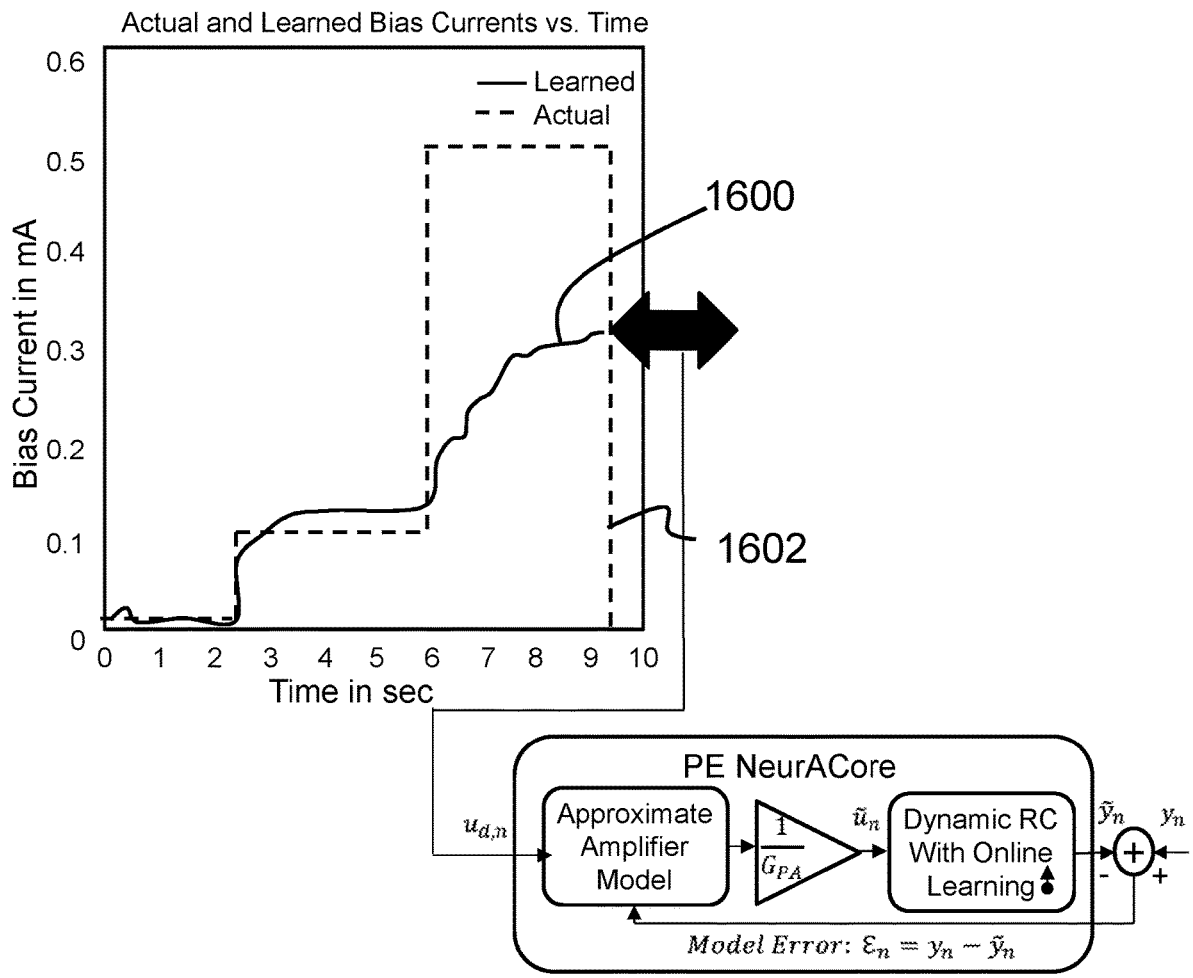
FIG. 16 is a plot chart depicting how the learned bias current value converges toward actual (unknown) bias current values.

The approach of the present disclosure demonstrated, by MATLAB simulations, that online learning of model parameters, such as bias current, significantly improved the amplifier linearization performance. The same gradient descent equations are applied for the bias current as described above and the simulation results are shown in FIG. 16. FIG. 16 is a graph depicting how the learned bias current value 1600 converged toward the actual (unknown) bias current values 1602.

Referring again to FIG. 14, the Controller block 1404 comprises a compensator 1432 and the inverse of the approximate model 1430, using learned system parameters and input, neuromorphic core, and output weights from the Model Physics Enhanced NeurACore 1402 to produce a distorted input to the physical system 1406 that results in the desired system output. With current weight and state information from the Dynamic NeurACore 1420, the compensator 1432 linearly extrapolates (in time) to determine advanced in time weight information. The advanced weight information is used to determine the compensated input $\tilde{u}_{n+1}$ to the inverse of the approximate model 1430. Because the Dynamic NeurACore 1420 is linear in system inputs, the compensated input $\tilde{u}_{n+1}$ can be efficiently determined. Finally, the compensated input $\tilde{u}_{n+1}$ is sent to the inverse approximate model 1430, whose system parameters have been propagated from the Model Physics Enhanced NeurACore 1402. The inverse approximate model 1432 produces the distorted system input that will be input to the physical system 1406.

Figure 17:
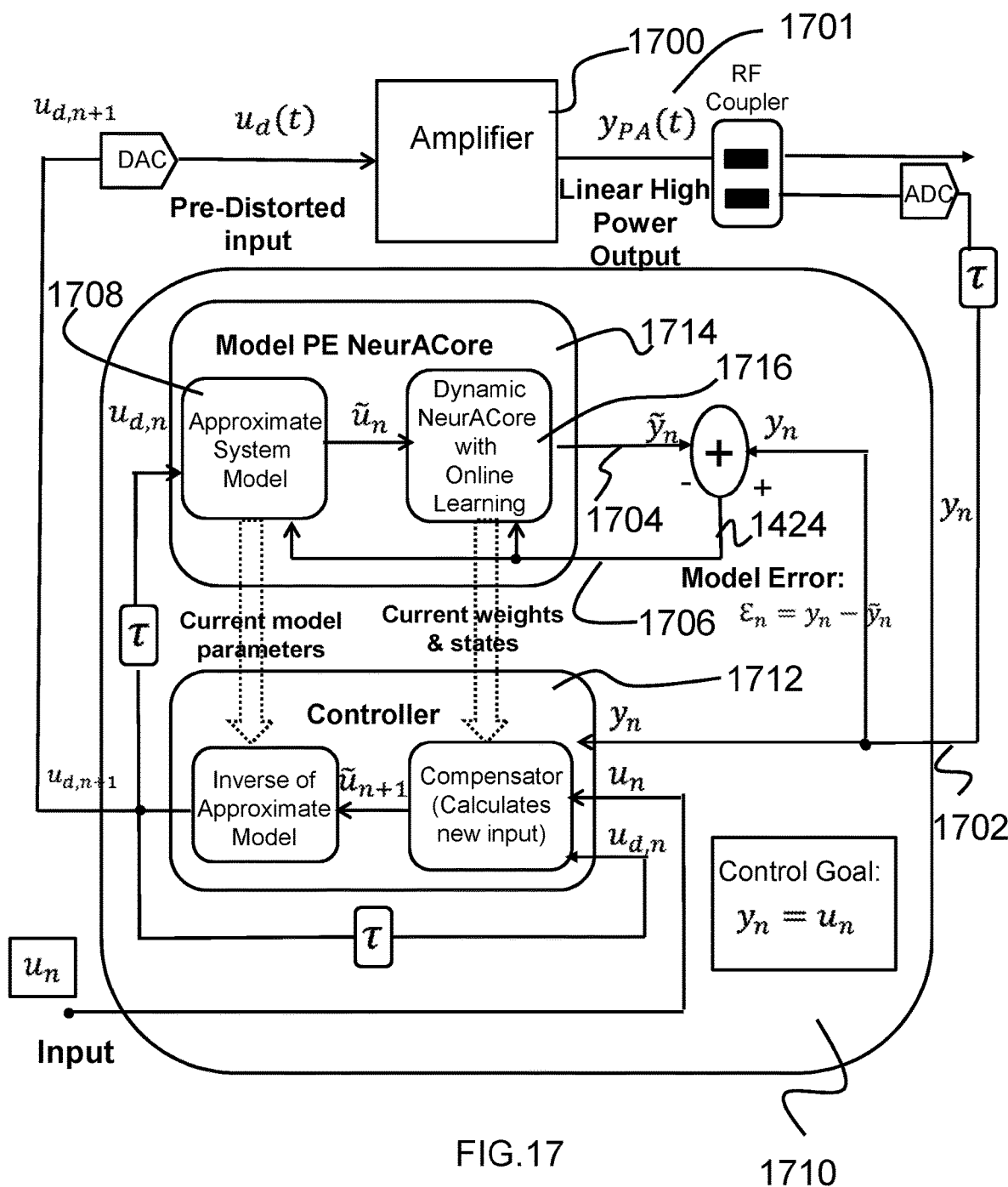
FIG. 17 is a block diagram of a Physics Enhanced NeurACore Controller according to various embodiments of the present invention.

For the amplifier linearization application (as shown in FIG. 17), a one-step ahead prediction based control algorithm is used where the NeurACore power amplifier (PA) model is described by the following update equations:

$$\underline{x}_N = \underline{A}\underline{x}_{n-1} + \underline{B}_C \tilde{u}_n + \underline{B}_P \tilde{u}_{n-1}$$

$$\tilde{y}_n = \sum_{k=0}^{K} \underline{C}_{n,k}^T \underline{x}_{n-k}$$

With reference to FIG. 17, the control procedure is described below in detail. It is assumed that the algorithm is currently processing the $n^{th}$ input sample. The control procedure is as follows:

1. Step 1: Use the latest output from the Power Amplifier (PA) 1700 and scale this output by the linear amplifier 1701 gain to calculate the latest scaled amplifier output value 1702, as follows:

$$y_n = \frac{1}{G_{PA}} y_{PA,n}$$

2. Step 2: Using the scaled PA output 1702 and the NeurACore output 1704, calculate the current error value 1706 and update the output layer weights described in the gradient descent update section, i.e., $\underline{C}_{n-1} \rightarrow \underline{C}_n$.

The current states, weights and error values associated with the current NeurACore PA model 1708 are $$\underline{X}_n, \underline{C}_n, \varepsilon_n \text{ in response to } \tilde{u}_n = \frac{1}{G_{PA}} f_a(u_{d,n})$$

3. Step 3: calculate the extrapolated weight matrix for the next time step $$\tilde{\underline{C}}_{n+1} = 2\underline{C}_n - \underline{C}_{n-1}.$$

4. Step 4: calculate the estimated input for the next time step assuming the next output will be equal to the next input, as follows:

$$\tilde{u}_{n+1} = \frac{1}{\left(\tilde{\underline{C}}_{n+1,0}^T \underline{B}_C\right)} \left\{ u_{n+1} - \sum_{k=1}^{K} \tilde{\underline{C}}_{n+1,k}^T \underline{x}_{n+1-k} - \tilde{\underline{C}}_{n+1,0}^T (\underline{A}\underline{x}_n + \underline{B}_P \tilde{u}_n) \right\}$$

where $$\underline{\hat{c}}^T_{n+1,0}$$

is the current output layer weight vector associated with the latest state variables, $\underline{B}_C$ is the input layer weights associated with the current input value, $$\underline{\hat{c}}^T_{n+1,k}$$

is the output layer weight vector associated with the $k^{th}$ clock cycle delayed state variables, and $\underline{B}_P$ is the input layer weights associated with the past input value.

5. Step 5: calculate the new distorted input from the estimated input above, as follows:

$$u_{d,n+1} = f_a^{-1}(G_{PA}\hat{u}_{n+1})$$

6. Step 6: repeat step 1 with n=n+1.

The Physics Enhanced NeurACore Controller 1710 as depicted in FIG. 17, has been demonstrated in simulation for real-time control of a linear amplifier 1700. As noted above, the block diagram for this application is shown in FIG. 17, with experimental results provided in further detail below.

For this application the desired output is a scaled version of the input. The physical system does not implement a perfect linear amplifier, so the controller 1712 must predistort the input so that the output is linear in the desired input. The (simulated) physical system is given by the combination of a nonlinear static amplifier model 1500 and a dynamic distortion model 1502 (shown in FIGS. 15A and 15B). It is described by the following equations:

$$I_D = \begin{cases} I_{SS} & V_{in} \geq \sqrt{\frac{2I_{SS}L}{\mu CW}} \\ \frac{\mu CW}{2L} V_{in}\sqrt{\frac{4I_{SS}L}{\mu CW} - V_{in}^2} & -\sqrt{\frac{2I_{SS}L}{\mu CW}} \leq V_{in} \leq \sqrt{\frac{2I_{SS}L}{\mu CW}} \\ -I_{SS} & V_{in} \leq \sqrt{\frac{2I_{SS}L}{\mu CW}} \end{cases}$$

$$\dot{V}_{out}C_D = -\frac{V_{out}}{R} - I_D$$

Figure 18:
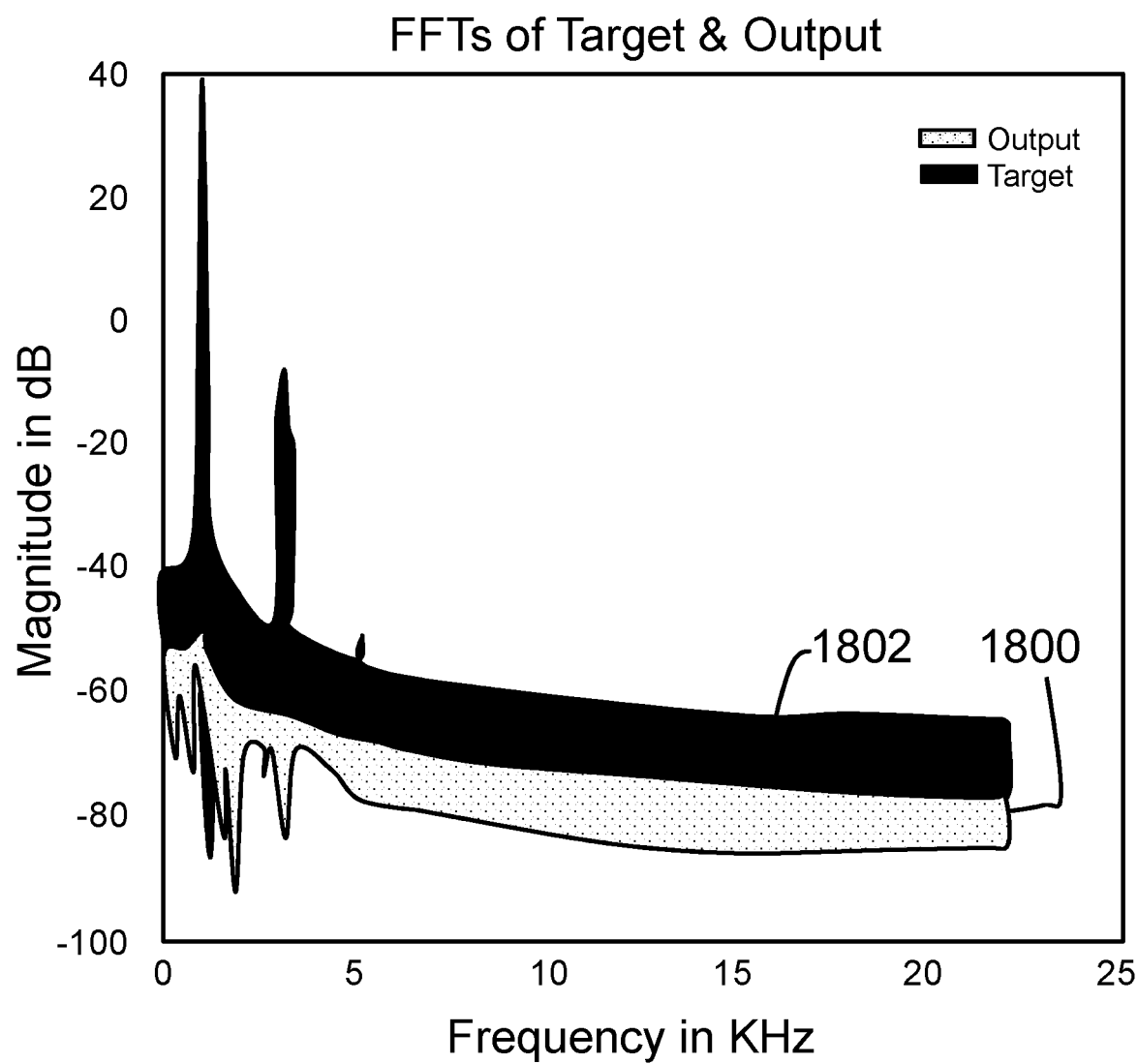
FIG. 18 is a graph depicting that the Model Physics Enhanced NeurACore output is able to accurately learn the behavior of the "real" amplifier, though the physics-based model is only approximate.

For the approximate amplifier model 1708, the Model Physics Enhanced NeurACore 1714 uses only the static nonlinear model (i.e., element 1500 in FIG. 15B) with detuned model parameters, together with a reservoir computer (subset of NeurACore 1716) whose output layer weights only are adjusted. FIG. 18 shows that for such a configuration, the Model Physics Enhanced NeurACore output 1800 is able to accurately learn the behavior of the "real" amplifier (the target 1802), though the physics-based model is only approximate.

Figure 19:
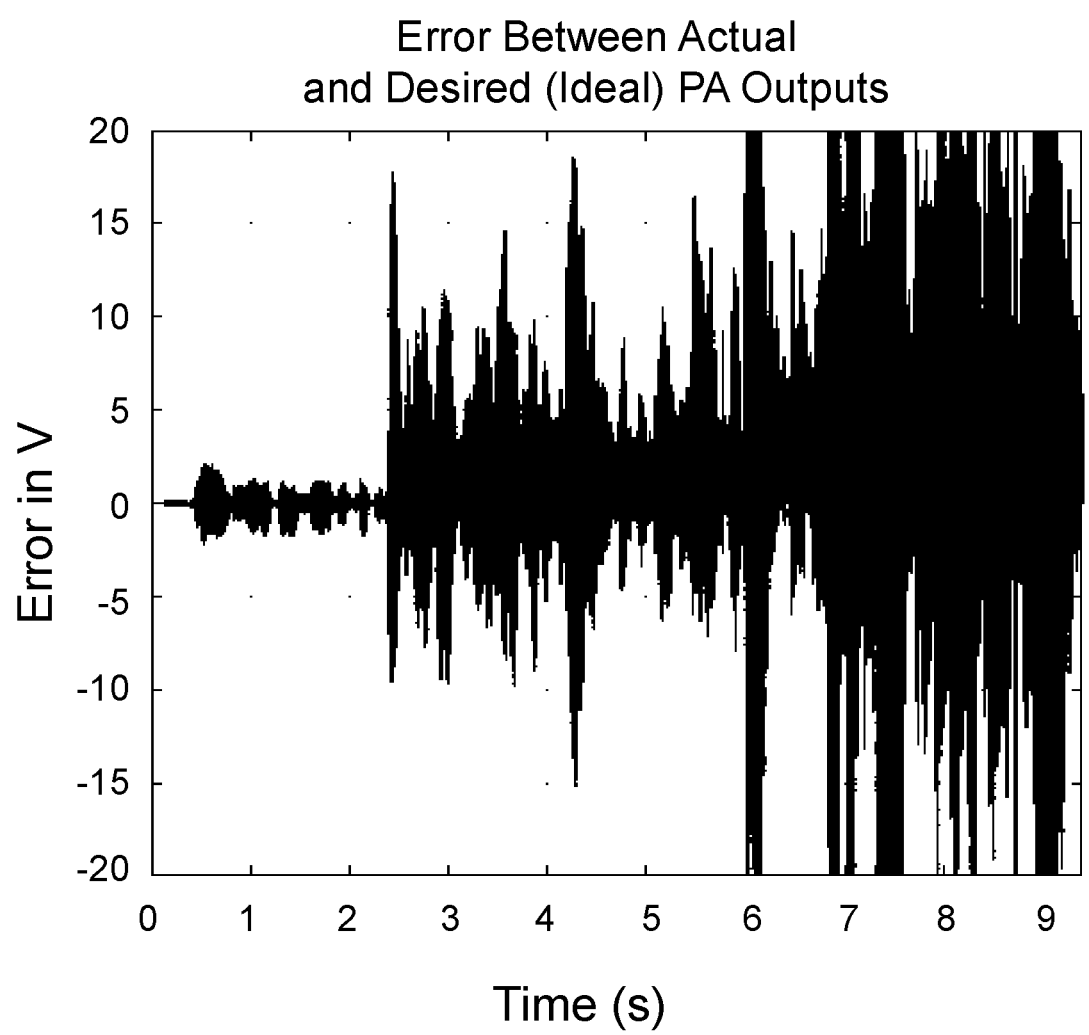
FIG. 19 is a plot graph depicting the difference between the desired (ideal) output and actual system output as a function of time, when the input is not adjusted from system changes.

Demonstration of both system learning and input predistortion to achieve the desired linear output response is shown in the figures described below. Two scenarios are demonstrated: the first shows the performance of the Physics Enhanced NeurACore Controller when the system undergoes "catastrophic" changes, with only the NeurACore adapting to the catastrophic changes, while the second allows both the approximate physics model and the NeurACore to change based on the system output and Model Physics Enhanced NeurACore output. In the first scenario, the physical system has a 10× bias current increase, parasitic capacitance reduction of 2×, and loading resistance increase by 3× at time t=2.4 s. The plot depicted in FIG. 19 shows the difference between the desired (ideal) output and actual system output as a function of time, when the input is not adjusted from system changes.

Figure 20:
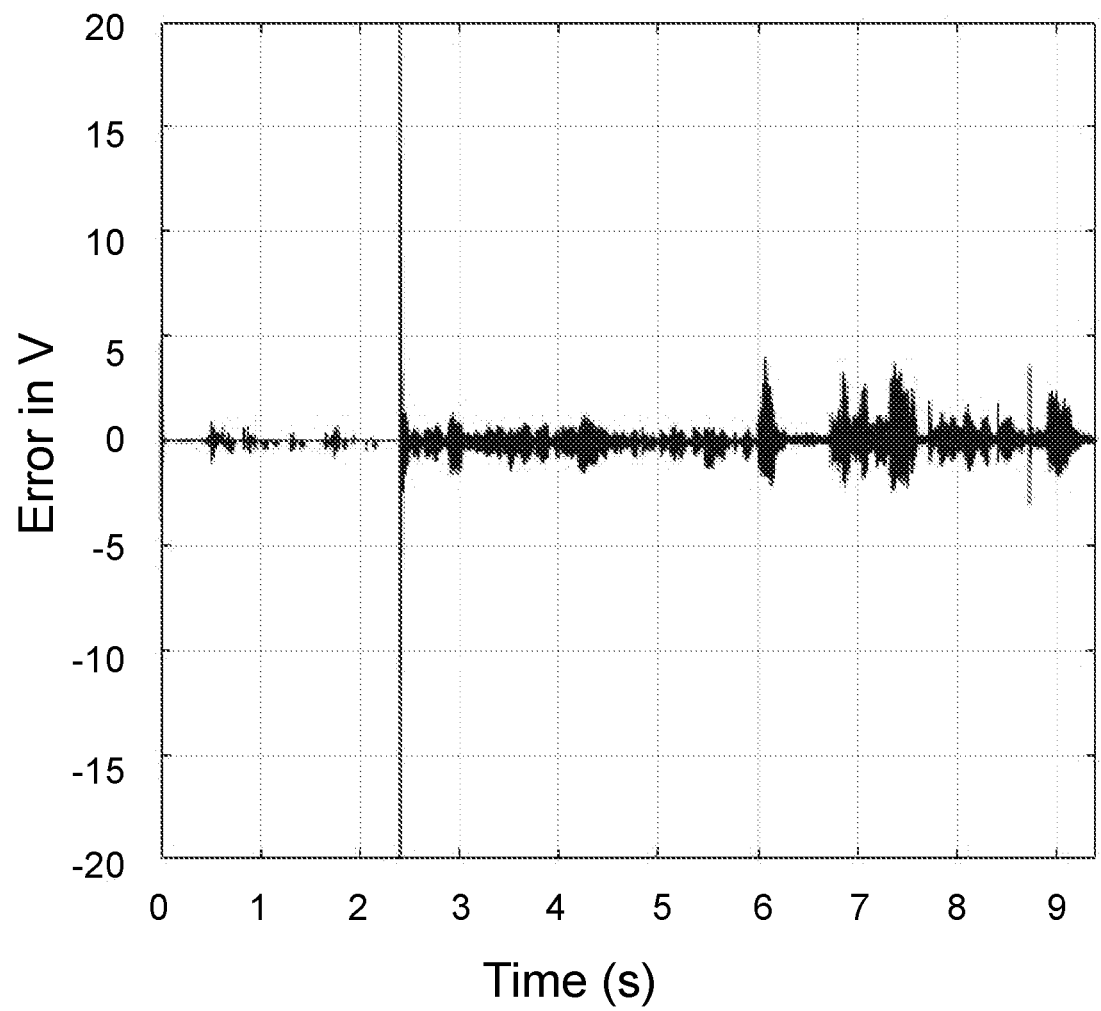
FIG. 20 is a chart depicting an error between desired and actual system output when the predistorted signal as input is significantly reduced.

When the NeurACore (in this case, only a reservoir computer whose output layer has been adapted) is used to adapt to system changes, and the controller predistorts the signal based on the learned weights, the error between desired and actual system output with the predistorted signal as input is significantly reduced, as shown in FIG. 20.

Figure 21:
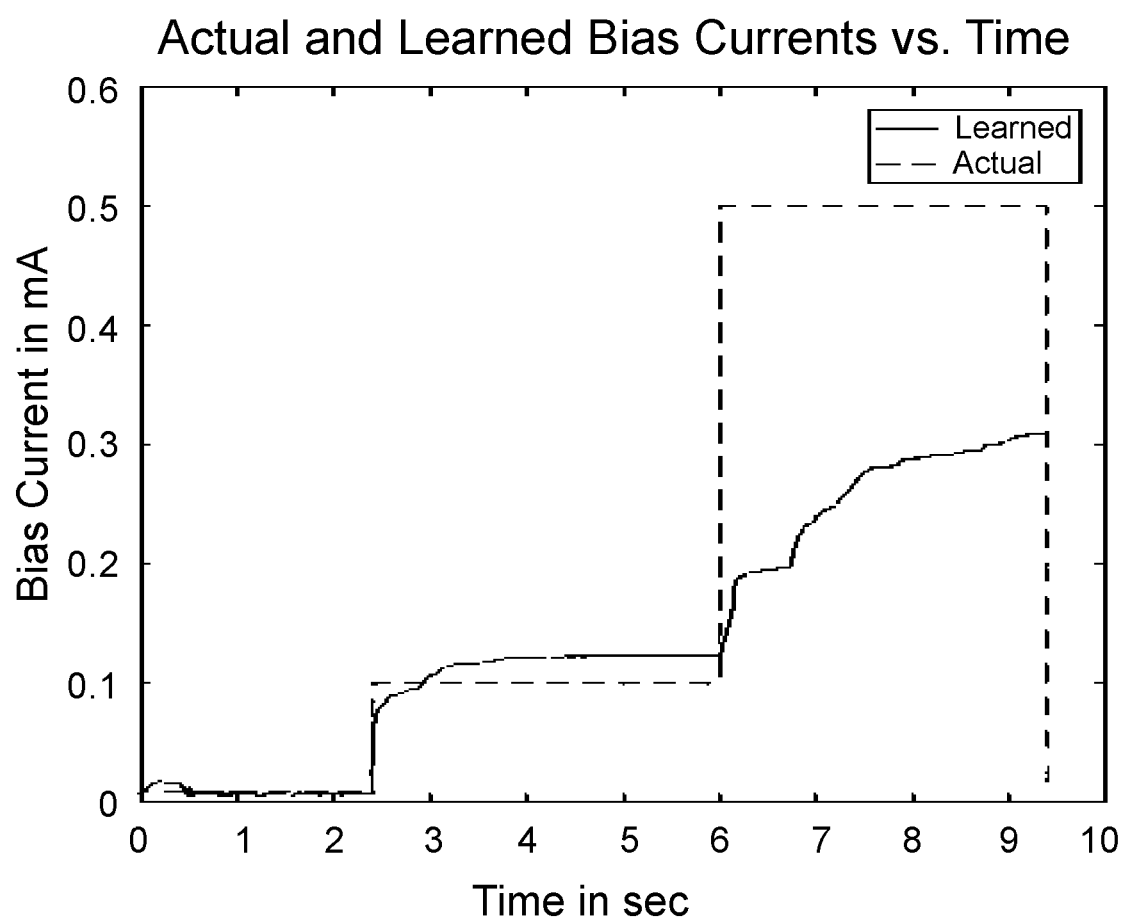
FIG. 21 is a plot chart depicting an approximation of the model's bias current evolution when the model is updated based on gradient descent minimization of the error signal with respect to the bias current parameter.
Figure 22:
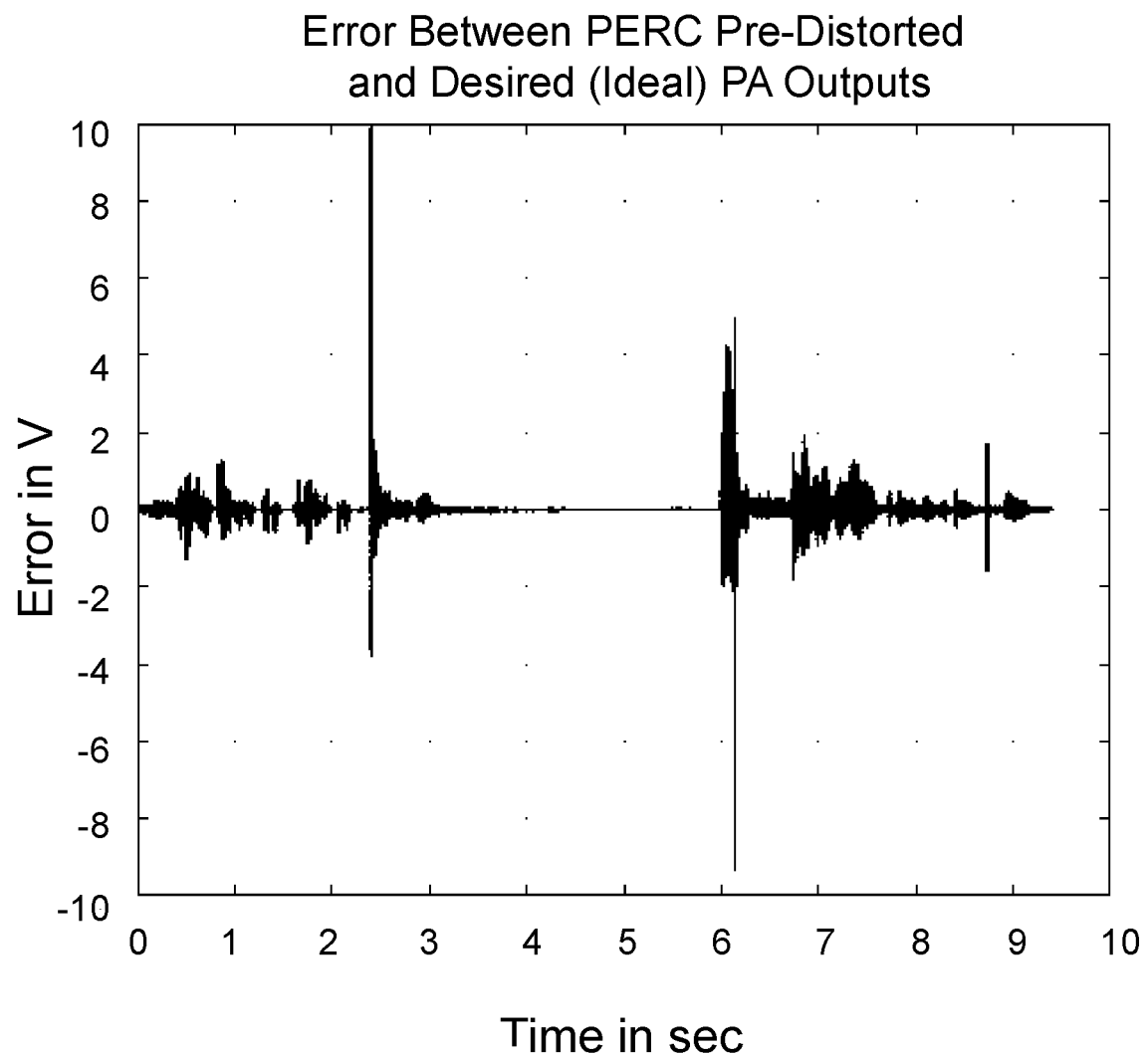
FIG. 22 is a chart depicting the error between the ideal output and the system output with a predisorted input.
Figure 23:
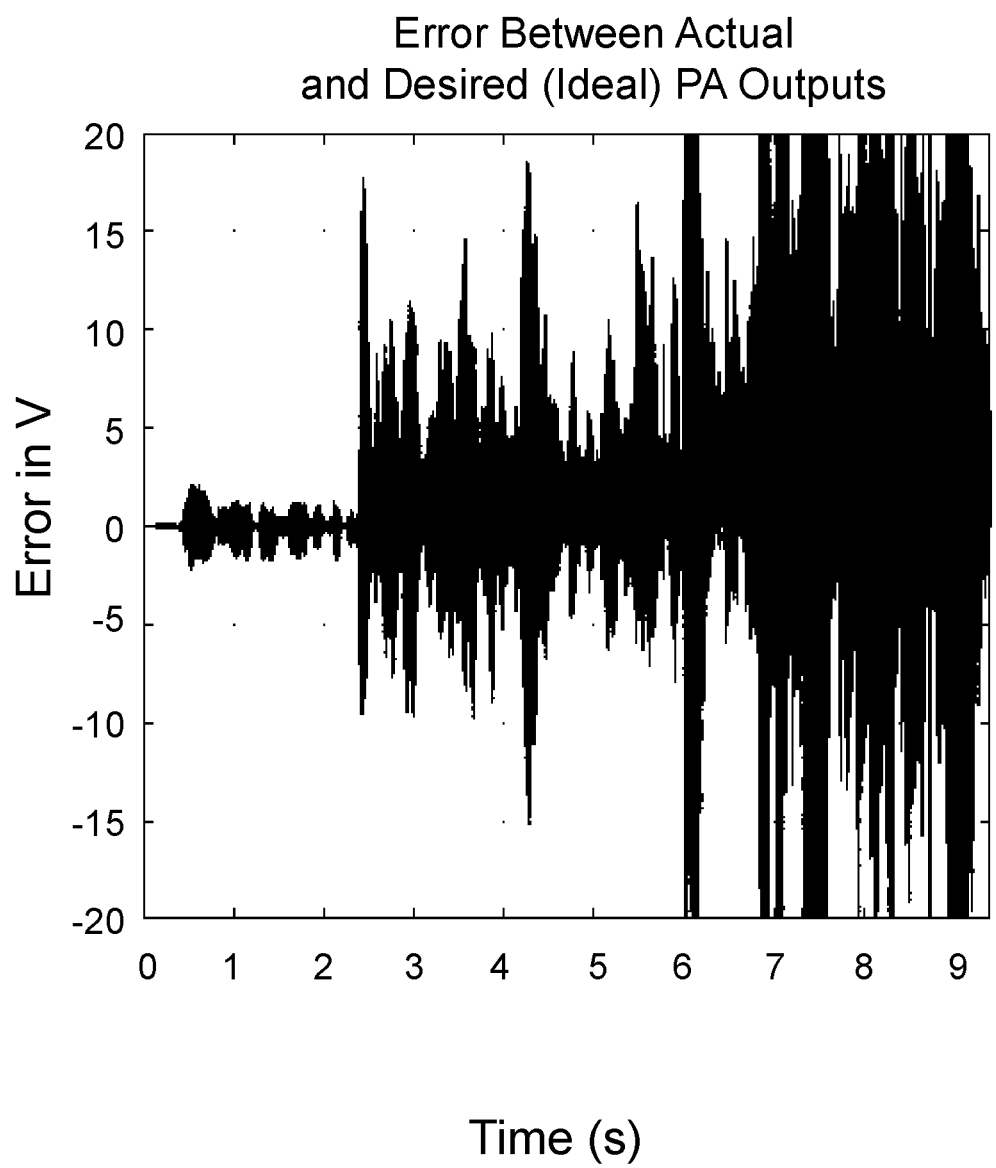
FIG. 23 is a chart depicting the error signal with no predistortion.

A second scenario demonstrates the adaptation of both approximate model parameters and NeurACore weights when the physical system changes in time. In this case, the amplifier two bias current changes as function of time. The plot of FIG. 21 shows the approximate model's bias current evolution when the model is updated based on gradient descent minimization of the error signal with respect to the bias current parameter. With the predisorted input incorporating model and NeurACore adaptation, the error between the ideal output and the system output with predisorted input is shown in FIG. 22. With no predistortion, the error signal is significantly worse, as shown in FIG. 23.

(3.3) Control of a Device

Figure 24:
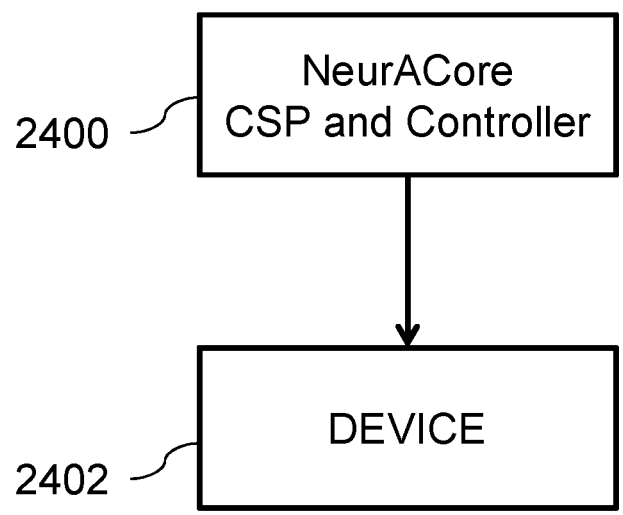
FIG. 24 is a block diagram depicting control of a device according to various embodiments.

As shown in FIG. 24, the physics enhanced neuromorphic adaptive controller and corresponding NeurACore 2400 has many applications. As a non-limiting example, the the physics enhanced neuromorphic adaptive controller and corresponding NeurACore 2400 may be used to control a device 2402 (e.g., a mobile device display, a virtual reality display, an augmented reality display, a computer monitor, a motor, an autonomous vehicle, a machine, a drone, a camera, etc.) based on the various inputs and desired or target outputs. In some embodiments, the device 2402 may be controlled to cause the device 2402 to move or otherwise initiate a physical action based on the discrimination and localization.

In some embodiments, a drone or other autonomous vehicle may be controlled to move to an area where an object is determined to be based on the imagery. In yet some other embodiments, a camera may be controlled to orient towards the an identified object. In other words, actuators or motors are activated to cause the camera (or sensor) to move or zoom in on the location where the object is localized. In yet another aspect, if a system is seeking a particular object and if the object is not determined to be within the field-of-view of the camera, the camera can be caused to rotate or turn to view other areas within a scene until the sought after object is detected.

In addition, in a non-limiting example of an autonomous vehicle having multiple sensors, such as cameras. The system or controller can cause the autonomous vehicle to perform a vehicle operation. For instance, if two vehicle sensors detect the same object, object detection and classification accuracy is increased and the system described herein can cause a precise vehicle maneuver for collision avoidance by controlling a vehicle component. For example, if the object is a stop sign, the system or controller may cause the autonomous vehicle to apply a functional response, such as a braking operation, to stop the vehicle. Other appropriate responses may include one or more of a steering operation, a throttle operation to increase speed or to decrease speed, or a decision to maintain course and speed without change. The responses may be appropriate for avoiding a collision, improving travel speed, or improving efficiency. Non-limiting examples of devices that can be controlled via the controller and NeurACore include a vehicle or a vehicle component, such as a brake, a steering mechanism, suspension, or safety device (e.g., airbags, seatbelt tensioners, etc.). Further, the vehicle could be an unmanned aerial vehicle (UAV), an autonomous ground vehicle, or a human operated vehicle controlled either by a driver or by a remote operator. As can be appreciated by one skilled in the art, control of other device types is also possible.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A Neuromorphic Adaptive Core (NeurACore) cognitive signal processor (CSP), comprising:
   one or more processors and associated computer-readable medium having executable instructions encoded thereon, such that upon execution of the instructions by the one or more processors, the one or more processors implement:
      a NeurACore local learning layer block, the NeurACore local learning layer block operable for receiving as an input a mixture of in-phase and quadrature (I/Q) signals and mapping the I/Q signals onto a neural network to determine complex-valued output weights of neural states of the neural network;
      an adaption module, the adaptation module embedding a time-evolving physical model into the NeurACore local learning layer block;
      a global learning layer, the global learning layer operable for adapting the complex-valued output weights to predict a most likely next value of the input I/Q signal; and
      a neural combiner, the neural combiner operable for combining a set of delayed neural state vectors with weights of the global learning layer to compute and generate an output signal, the output signal being separate in-phase and quadrature signals.

2. The NeurACore CSP as set forth in claim 1, wherein the time-evolving physical model evolves the NeurACore local learning layer block based on at least one of a neural state vector, an input signal, embedded physical equations reflecting current dynamics of a physical system.

3. The NeurACore CSP as set forth in claim 2, wherein the NeurACore local learning layer block includes oscillators that represent an instantaneous spectrum of the input mixture of I/Q signals.

4. The NeurACore CSP as set forth in claim 3, wherein the input mixture I/Q signals are an input signal selected from a communication signal and a radar signal, with the output signal being denoised communication and radar signals.

5. The NeurACore CSP as set forth in claim 4, wherein the NeurACore local learning layer block is adaptable for frequency and quality factor.

6. The NeurACore CSP as set forth in claim 5, wherein the NeurACore local learning layer utilizes blind source separation to separate signals similar in frequency.

7. The NeurACore CSP as set forth in claim 1, further comprising a physics enhanced neuromorphic adaptive controller electronically coupled with both a physical system and with the NeurAcore CSP for controlling the NeurACore CSP.

8. A physics enhanced neuromorphic adaptive controller, comprising:
   one or more processors and associated computer-readable medium having executable instructions encoded thereon, such that upon execution of the instructions by the one or more processors, the one or more processors implement:
      a physics-enhanced (PE) neuromorphic adaptive core (NeurACore), the PE NeurACore having an approximate physics-based system model that models operations of a physical system and a dynamic NeurACore with online learning, the PE NeuraCore being operable for receiving as an input a mixture of in-phase and quadrature (I/Q) signals and generating an output signal, the output signal being separate in-phase and I/Q signals; and
      a controller coupled to the PE NEurACore, the controller operable for controlling the physical system based on the separate in-phase and I/Q signals.

9. The physics enhanced neuromorphic adaptive controller as set forth in claim 8, further comprising a physical system coupled to the physics enhanced neuromorphic adaptive controller.

10. The physics enhanced neuromorphic adaptive controller as set forth in claim 9, wherein the PE NeurACore includes system parameters, input layer weights, reservoir poles, and output layer weights, that are adjustable in real-time to capture behavior of the physical system.

11. The physics enhanced neuromorphic adaptive controller as set forth in claim 8, wherein the controller includes a compensator and inverse physical system model that uses learned parameters of the PE NeurACore to generate a pre-distorted input signal that, when fed to the physical system, produces the desired physical system output.

12. A computer implemented method for signal processing using a Neuromorphic Adaptive Core (NeurACore) cognitive signal processor (CSP), comprising acts of:
   using a NeurACore local learning layer block, receiving as an input a mixture of in-phase and quadrature (I/Q) signals and mapping the I/Q signals onto a neural network to determine complex-valued output weights of neural states of the neural network;
   using an adaption module to embed a time-evolving physical model into the NeurACore local learning layer block;
   using a global learning layer, adapting the complex-valued output weights to predict a most likely next value of the input I/Q signal; and
   using a neural combiner, combining a set of delayed neural state vectors with weights of the global learning layer to compute and generate an output signal, the output signal being separate in-phase and quadrature signals.

13. The method as set forth in claim 12, wherein the time-evolving physical model evolves the NeurACore local learning layer block based on at least one of a neural state vector, an input signal, embedded physical equations reflecting current dynamics of a physical system.

14. The method as set forth in claim 13, wherein the NeurACore local learning layer block includes oscillators that represent an instantaneous spectrum of the input mixture of I/Q signals.

15. The method as set forth in claim 14, wherein the input mixture I/Q signals are an input signal selected from a communication signal and a radar signal, with the output signal being denoised communication and radar signals.

16. The method as set forth in claim 15, wherein the NeurACore local learning layer block is adaptable for frequency and quality factor.

17. The method as set forth in claim 16, wherein the NeurACore local learning layer utilizes blind source separation to separate signals similar in frequency.

18. A computer program product for signal processing using a Neuromorphic Adaptive Core (NeurACore) cognitive signal processor (CSP), the computer program product comprising:

a non-transitory computer-readable medium having executable instructions encoded thereon, such that upon execution of the instructions by one or more processors, the one or more processors perform operations of:

receiving as an input a mixture of in-phase and quadrature (I/Q) signals and mapping the I/Q signals onto a neural network to determine complex-valued output weights of neural states of the neural network;

embedding a time-evolving physical model into the NeurACore local learning layer block;

adapting the complex-valued output weights to predict a most likely next value of the input I/Q signal; and combining a set of delayed neural state vectors with weights of the global learning layer to compute an output signal, the output signal being separate in-phase and quadrature signals.

\* \* \* \* \*